(12) United States Patent
Duffy et al.

(10) Patent No.: US 11,958,593 B2
(45) Date of Patent: Apr. 16, 2024

(54) PASSIVE MECHANICAL ROTOR LOCK FOR SMALL UNMANNED AIRCRAFT SYSTEMS (UAS)

(71) Applicant: Aurora Flight Sciences Corporation, a subsidiary of The Boeing Company, Manassas, VA (US)

(72) Inventors: Michael J. Duffy, St. Louis, MO (US); Shaun M. Detloff, Huntington Beach, CA (US)

(73) Assignee: AURORA FLIGHT SCIENCES CORPORATION, A SUBSIDIARY OF THE BOEING COMPANY, Chicago, IL (US)

( * ) Notice: Subject to any disclaimer, the term of this patent is extended or adjusted under 35 U.S.C. 154(b) by 16 days.

(21) Appl. No.: 17/529,025

(22) Filed: Nov. 17, 2021

(65) Prior Publication Data
US 2022/0161926 A1 May 26, 2022

Related U.S. Application Data

(60) Provisional application No. 63/117,592, filed on Nov. 24, 2020.

(51) Int. Cl.
*B64C 27/30* (2006.01)
*B64C 29/00* (2006.01)
*B64D 27/24* (2006.01)

(52) U.S. Cl.
CPC .......... *B64C 27/30* (2013.01); *B64C 29/0025* (2013.01); *B64D 27/24* (2013.01)

(58) Field of Classification Search
CPC ..... B64C 27/30; B64C 11/325; B64C 11/343; B64C 1/346
See application file for complete search history.

(56) References Cited

U.S. PATENT DOCUMENTS

| 9,783,288 B1 * | 10/2017 | Moore | H02K 49/10 |
| 10,059,440 B2 | 8/2018 | Erdozain et al. | |
| 10,894,599 B1 * | 1/2021 | Popiks | B64U 10/25 |

FOREIGN PATENT DOCUMENTS

| WO | WO-2015073084 A1 * | 5/2015 | B60K 6/365 |
| WO | WO-2022097137 A1 * | 5/2022 | |

* cited by examiner

*Primary Examiner* — Philip J Bonzell
*Assistant Examiner* — Ashesh Dangol
(74) *Attorney, Agent, or Firm* — Gates & Cooper LLP

(57) ABSTRACT

A propeller assembly including a shaft having a rotational axis; a plurality of propellers connected to the shaft; means for deploying the plurality of propellers using a centrifugal force generated from a rotation of the shaft, so as to provide vertical thrust during a vertical take-off and landing of the aircraft; and means for restoring the propellers into a stowed configuration.

16 Claims, 14 Drawing Sheets

# PASSIVE MECHANICAL ROTOR LOCK FOR SMALL UNMANNED AIRCRAFT SYSTEMS (UAS)

CROSS REFERENCE TO RELATED APPLICATIONS

This application claims the benefit under 35 U.S.C. Section 119(e) of commonly-assigned U.S. Provisional Patent Application No. 63/117,592, filed Nov. 24, 2020, by Michael J. Duffy and Shaun M. Detloff, entitled "PASSIVE MECHANICAL ROTOR LOCK FOR SMALL UNMANNED AIRCRAFT SYSTEMS," which application is incorporated by reference herein.

BACKGROUND

1. Field

The present disclosure relates to propeller assemblies, aircraft including the same, and associated methods.

2. Description of the Related Art

Aircraft such as rotorcraft utilize propellers to generate a vertical thrust for lifting the aircraft. In some such examples, the propellers are utilized primarily during take-off and landing of the aircraft (and/or for other altitude adjustments), and the aircraft further includes a forward thrust generator for propelling the aircraft forward. However, the propellers generating the vertical thrust also output considerable noise when operating at high revolutions per minute. In such examples, it is desirable to configure the propellers for maximum vertical thrust production at low rotational velocities and with reduced noise, which may be accomplished by increasing the number of propellers and/or the number of propeller blades of each propeller. However, in such examples, it also is desirable to configure the propellers to generate a low drag force when not in use, such as when the aircraft is propelled forward through air. The present disclosure satisfies this need.

SUMMARY

Propeller assemblies, aircraft including the same, and associated methods are disclosed herein.

Illustrative, non-exclusive examples of inventive subject matter according to the present disclosure are described in the following enumerated paragraphs:

A1. propeller assembly, comprising:
  a rotating assembly comprising a propeller, the rotating assembly rotatably connected to a non-rotating member so as to rotate about a rotational axis relative to the non-rotating member;
  one or more pairs of magnets including a first magnet mounted to the rotating assembly and a second magnet mounted to the non-rotating member, the second magnet forming an attractive magnetic interaction with the first magnet along an alignment direction; and wherein:
  one or more distances along the alignment direction between the first magnet and the second magnet are adjusted so that:
  the attractive magnetic interaction induces alignment of the propeller in a stowed configuration when the angular velocity is reduced below a predetermined value, and
  a propeller torque, outputted from a motor and driving the propeller at the angular velocity greater than the predetermined value, is greater than a force applied to the rotating assembly by the attractive magnetic interaction A2. The propeller assembly of paragraph A1, wherein:
  the pairs comprise a first pair and a second pair,
  the first magnet in the first pair is mounted at a first position on the rotating assembly,
  the second magnet in in the first pair is mounted at a second position on the non-rotating member,
  the second magnet in the second pair is mounted at a third position on the non-rotating member, the third position and the second position on diametrically opposite sides of the rotational axis, and
  the first magnet in the second pair is mounted at a fourth position on the rotating assembly, the fourth position and the first position on diametrically opposite sides of the rotational axis.

A3. The propeller assembly of example A2, wherein the first magnet and the second magnet are each sized to fit in an area having a width smaller than a largest width of the propeller.

A4. The propeller assembly of any of the paragraphs A1-A3, wherein:
  the first magnet has a first pole, and
  the second magnet has a second pole magnetically attracted to the first pole and facing the first pole in the stowed configuration.

A5. The propeller assembly of paragraph A1, wherein:
  the motor comprises an out-runner motor comprising a stator and a rotor and the rotating assembly comprises the rotor coupled to the propeller, or
  the motor comprises an in-runner motor, the rotating assembly comprises a shaft coupled to the propeller, and the motor drives the propeller via the shaft.

A6. The propeller assembly of any of the paragraphs A1-A5, further comprising one or more mechanisms adjustably mounting the second magnet to the non-rotating member, wherein the mechanisms enable movement of the second magnet along the alignment direction and fix the second magnet to the non-rotating member at the one or more distances.

A7. The propeller assembly of paragraph A6, wherein the mechanism comprises a linear rail or linear mount allowing linear translation of the second magnet along the alignment direction.

A8. The propeller assembly of any of the paragraphs A1-A5, further comprising a mechanism connected to the rotating member and comprising the first magnet, the mechanism configured to move the first magnet away from the second magnet in response to a centrifugal force acting on the mechanism, the centrifugal force generated by the rotating assembly rotating about the rotational axis at the angular velocity greater than the predetermined value.

A9. The propeller assembly of paragraph A7, wherein:
  the motor comprises an in-runner motor,
  the rotating assembly comprises a shaft connected to the propeller,
  the motor drives the propeller via the shaft, and
  the mechanism is mounted to the shaft.

A10. The propeller assembly of any of the paragraphs A1-A9, further comprising a spring coupling the first magnet to the rotating assembly, the spring:
  extending so as to move the first magnet away from the second magnet in response to a centrifugal force generated by the rotating assembly rotating about the rotational axis at the angular velocity greater than the predetermined value; and having a bias force configured to bias the first magnet at a position wherein the attractive magnetic interaction is configured to hold the propeller in a stowed configuration when the angular velocity is reduced below a predetermined value.

A11. The propeller assembly of any of the paragraphs A1-A9, further comprising a hinge coupling the first magnet to the rotating assembly, the hinge:

pivoting the first magnet away from the second magnet in response to a centrifugal force generated by the rotating assembly rotating about the rotational axis at the angular velocity greater than the predetermined value; and holding the first magnet at a position wherein the attractive magnetic interaction is configured to hold the propeller in the stowed configuration when the angular velocity is reduced below a predetermined value.

A12. The propeller assembly of any of the paragraphs A1-A9, further comprising a lever coupling the first magnet to the rotating assembly, the lever having a lever arm:

moving the first magnet away from the second magnet in response to a centrifugal force generated by the rotating assembly rotating about the rotational axis at the angular velocity greater than the predetermined value; and holding the first magnet at a position wherein the attractive magnetic interaction applies is configured to hold the propeller in the stowed configuration when the angular velocity is reduced below the predetermined value.

A13. A propeller assembly, comprising:

a rotating assembly comprising a propeller, the rotating assembly rotatably connected to a non-rotating member so as to rotate about a rotational axis relative to the non-rotating member;

a first magnet attached to the rotating assembly;

a second magnet mounted to the non-rotating member;

a mechanism connected to the rotating assembly and comprising the first magnet, the mechanism configured to:

move the first magnet away from the second magnet into a first configuration in response to a centrifugal force acting on the mechanism, the centrifugal force generated by the rotating assembly rotating about the rotational axis at an angular velocity greater than the predetermined value, position the first magnet closer to the second magnet in a second configuration when the angular velocity is smaller than the predetermined value, wherein:

an attractive magnetic interaction between the first magnet and the second magnet in the second configuration induces alignment of the propeller in a stowed configuration when the angular velocity is reduced below the predetermined value, and any attractive magnetic interaction between the first magnet and the second magnet in the first configuration is less than a propeller torque outputted from a motor driving the propeller at the angular velocity greater than the predetermined value.

A14. The propeller assembly of paragraph A13, wherein the mechanism comprises a spring coupling the second magnet to the rotating assembly, the spring:

extending so as to move the first magnet away from the second magnet in response to the centrifugal force generated by the rotating assembly rotating about the rotational axis at the angular velocity greater than the predetermined value, and having a bias force configured to bias the first magnet at a position wherein the attractive magnetic interaction is configured to hold the propeller in the stowed configuration when the angular velocity is reduced below a predetermined value.

A15. The propeller assembly of paragraph A13, further comprising a hinge coupling the first magnet to the rotating assembly, the hinge:

pivoting the first magnet away from the second magnet in response to the centrifugal force generated by the rotating assembly rotating about the rotational axis at the angular velocity greater than the predetermined value; and pivoting the first magnet towards the second magnet to a position wherein the attractive magnetic interactions are configured to hold the propeller in the stowed configuration when the angular velocity is reduced below the predetermined value.

A16. The propeller assembly of any of the paragraphs A1-A15, wherein the attractive magnetic interaction locks or holds the propeller in the stowed configuration.

A17. An aircraft comprising the propeller assembly of any of the paragraphs A1-A16, further comprising:

a fuselage;

the propeller assembly operatively connected to the fuselage;

a motor connected to the rotating assembly to rotate the propeller; and a computer coupled to the motor, wherein the computer is configurable to command the motor to:

output the propeller torque, so that the propeller assembly generates the lift during a vertical flight of the aircraft, and decrease the angular velocity below the predetermined value so that the attractive magnetic interaction holds the propeller in a stowed configuration when the aircraft is cruising or moving in horizontal flight.

A18. The aircraft of paragraph A17, wherein:

the propeller comprises one or more propeller blades having a longitudinal axis, and the longitudinal axis in the stowed configuration is substantially aligned along the forward direction so as to reduce a drag of the propeller when the aircraft is moving in the forward direction.

A19. The aircraft of paragraph A18, wherein the one or more distances are adjusted to account for an airflow impinging on the propeller blades moving the longitudinal axis into alignment with the alignment direction.

B1. A method of controlling a propeller assembly, comprising:

controlling a propeller assembly wherein the propeller assembly includes:

a rotating assembly comprising a propeller, the rotating assembly rotatably connected to a non-rotating member so as to rotate about a rotational axis relative to the non-rotating member;

one or more pairs of magnets including a first magnet mounted to the rotating assembly and a second magnet mounted to the non-rotating member, the second magnet forming an attractive magnetic interaction with the first magnet along an alignment direction; and wherein:

one or more distances between the first magnet and the second magnet along the alignment direction are adjusted so that the attractive magnetic interaction induces alignment of the propeller in a stowed configuration when the angular velocity is reduced below a predetermined value; and deploying the propeller away from the stowed configuration, comprising outputting a propeller torque from a motor and driving the propeller at the angular velocity greater than the predetermined value so that the propeller torque is greater than a force applied to the rotating assembly by the attractive magnetic interaction.

B2. The method of paragraph B1, wherein the propeller torque is used to generate lift during at least one of a take-off, a first transition from take-off to horizontal flight, and a second transition between horizontal flight and landing of an aircraft operably connected to the propeller assembly.

BRIEF DESCRIPTION OF THE DRAWINGS

FIGS. 3A-3C illustrate an example propeller assembly driven by an out-runner motor and including an adjustable mount mounting a magnet to the non-rotating member, wherein FIG. 3A is a side view, FIG. 3B is a top view, and FIG. 3C shows an example with multiple pairs of magnets.

FIGS. 4A-4D illustrate an example propeller assembly driven by an out-runner motor and including a spring mounting a magnet to the rotating assembly, wherein FIG. 4A is a side view illustrating the propeller assembly in a deployed configuration, FIG. 4B is a side view illustrating the propeller assembly in a stowed configuration, FIG. 4C is a top view, and FIG. 4D shows an example with multiple pairs of magnets.

FIGS. 5A-5C illustrate an example propeller assembly driven by an out-runner motor and including a hinge mounting a magnet to the rotating assembly, wherein FIG. 5A is a side view illustrating the propeller assembly in a stowed configuration, FIG. 5B is a side view illustrating the propeller assembly in a deployed configuration, and FIG. 5C shows an example with multiple pairs of magnets.

FIGS. 6A-6C illustrate an example propeller assembly driven by an in-runner motor and including a hinge mounting a magnet to a shaft, wherein FIG. 6A is a side view illustrating the propeller assembly in a deployed configuration, FIG. 6B is a side view illustrating the propeller assembly in a stowed configuration, and FIG. 6C shows an example with multiple pairs of magnets.

DESCRIPTION

In the following description, reference is made to the accompanying drawings which form a part hereof, and which is shown, by way of illustration, several examples. It is understood that other examples may be utilized and structural changes may be made without departing from the scope of the present disclosure.

Technical Description

In some circumstances propeller assemblies may generate an undesirable drag force, such as when the propellers are selectively disabled from producing thrust and the aircraft moves in a forward (e.g., horizontal) direction under the power of a separate thrust source or glide. Accordingly, and as described herein, the present disclosure is directed to propeller assemblies that include at least one propeller assembly that is configured to transition between a thrust-generating mode of operation and a low-drag mode of operation. Examples of suitable aircraft include aerobots, drones, autonomous air vehicles, vertical take off and landing vehicle, short take-off and landing vehicle, unmanned aerial vehicles (UAVs), and the like.

Figure 1A:
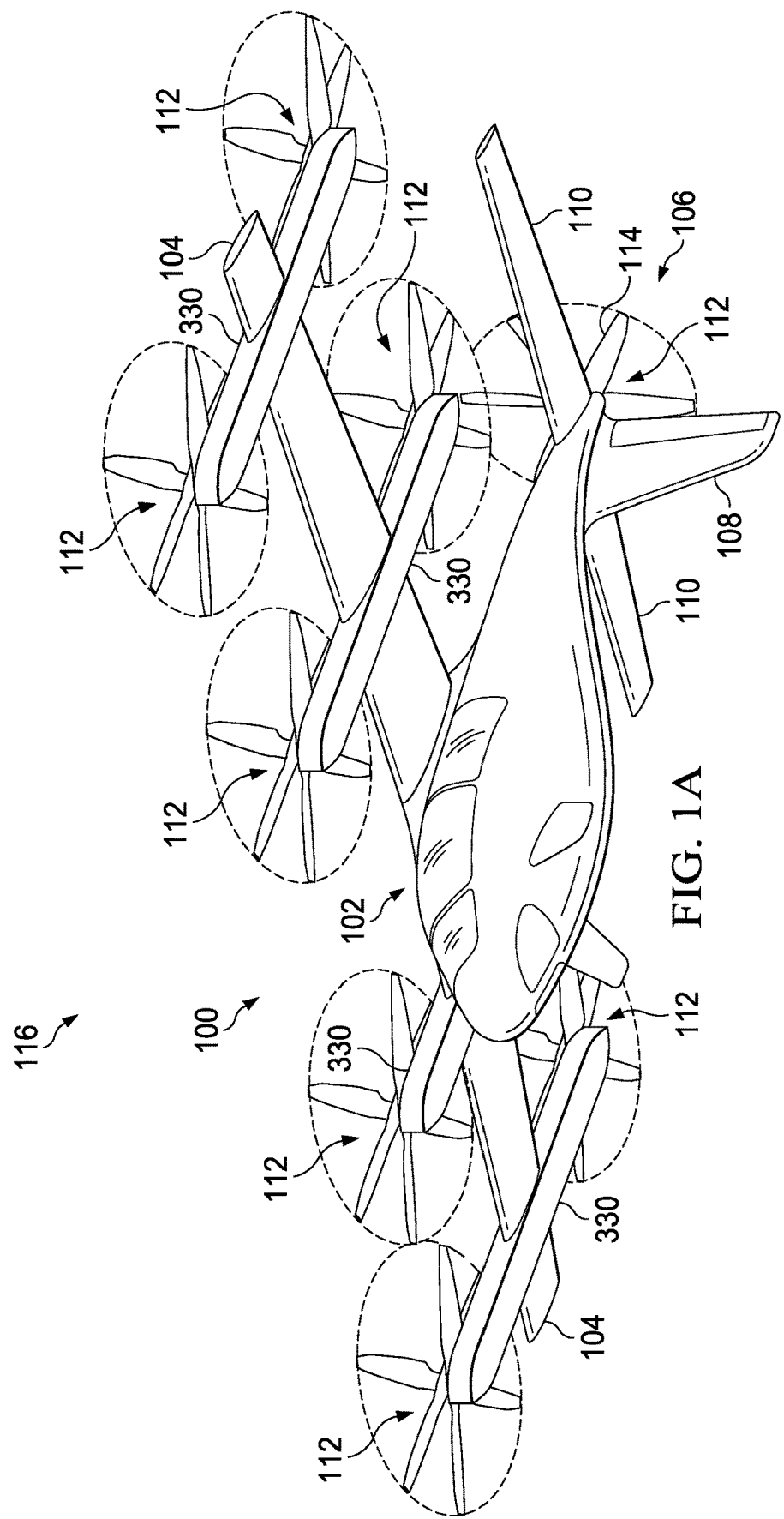
FIG. 1A illustrates an aircraft including a plurality of propeller assemblies deployed for providing thrust during take-off, for example.
Figure 1B:
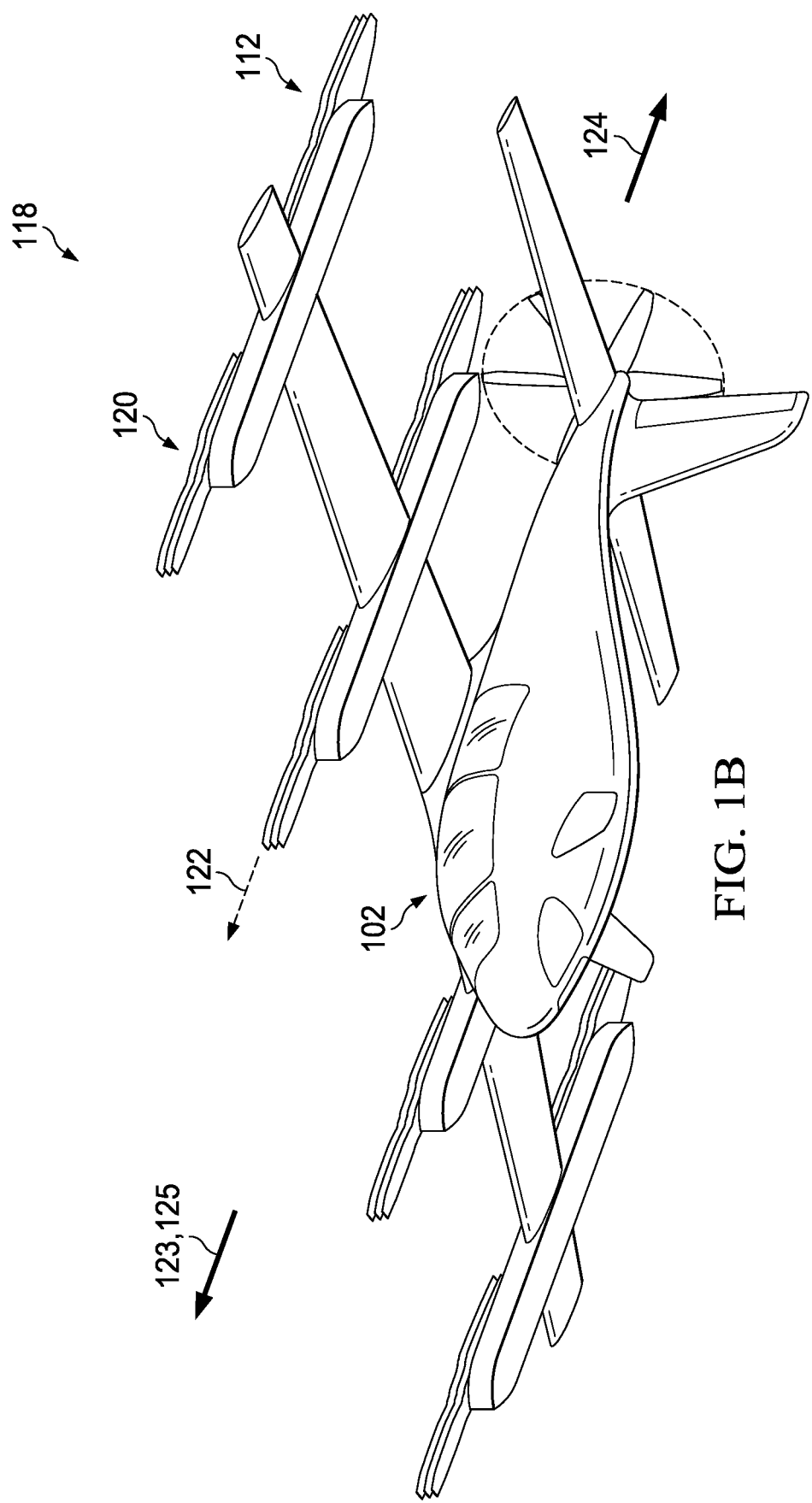
FIG. 1B illustrates the aircraft including the plurality of propeller assemblies folded in a stowed configuration for horizontal flight.

FIGS. 1A-1B illustrates one type of aircraft 100 benefitting from example implementations of the present disclosure. As shown, the aircraft generally includes a fuselage 102, wings 104 extending from opposing sides of the aircraft in a mid-section of the fuselage, and an empennage or tail assembly 106 at a rear end of the fuselage. The tail assembly includes a vertical stabilizer 108 and two horizontal stabilizers 110 extending from opposing sides of the aircraft. One or more propellers 112 and 114 comprising propeller blades 120 are mounted to respectively the wings and the end of the tail assembly for lifting and propelling the aircraft during flight. FIG. 1A shows the propellers 112 in a deployed configuration 116 and FIG. 1B illustrates the propellers in a stowed configuration 118 wherein the propeller blades 120 have their longitudinal axis 122 aligned with (parallel to) the direction of the airflow 124 and/or the horizontal direction 123 of horizontal flight 125 and/or the forward direction of forward flight.

Figure 1C:
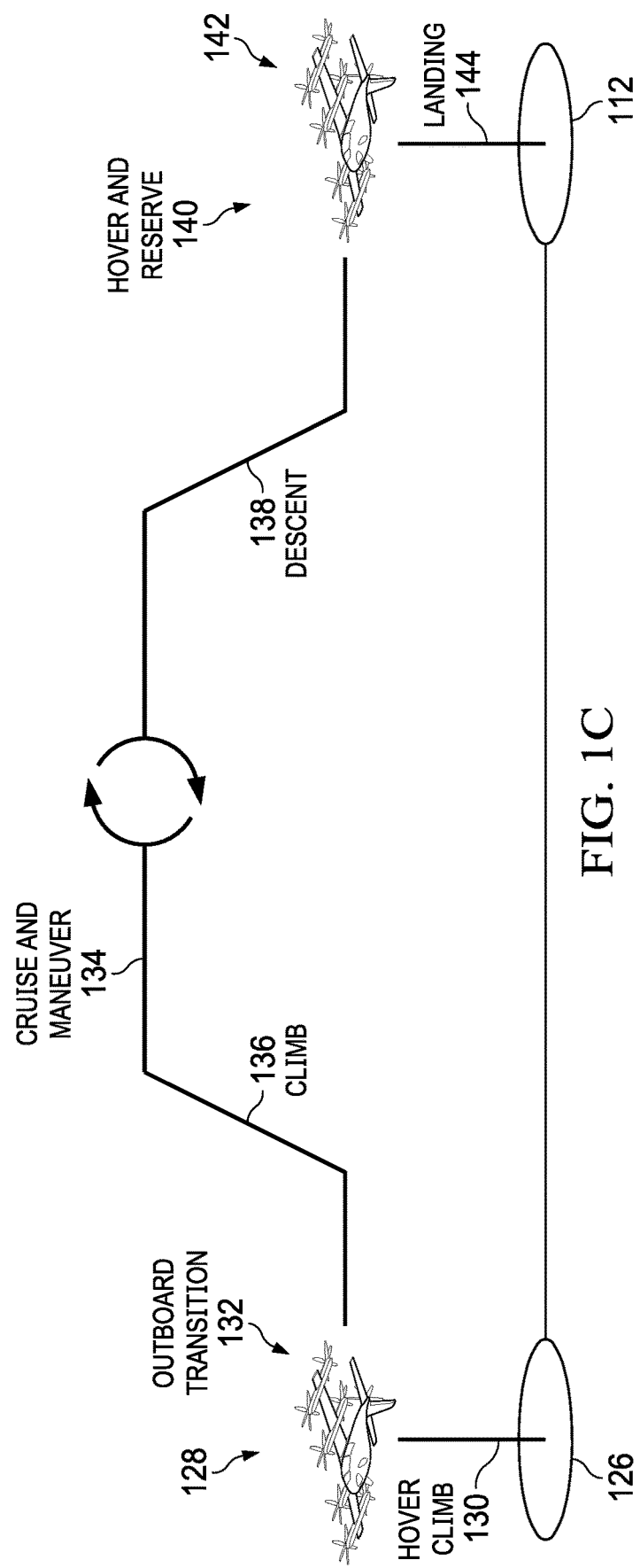
FIG. 1C illustrates example segments of a flight propelled using propeller assemblies according to one or more examples described herein.

FIG. 1C illustrates the segments of an example flight comprising vertical takeoff 126, hovering 128 (e.g., loitering, hover climb 130); transitioning 132 between vertical flight and cruise (e.g., horizontal flight); cruising 134; in flight climbing 136; descent 138, hovering 140 for landing; hovering 140, transitioning 142 between horizontal flight and vertical landing 144; and vertical landing 144. In one or more examples, the propeller 112 is in a deployed configuration during transitioning, vertical takeoff, and vertical landing segments and is in a stowed configuration during forward cruising 134.

Figure 2A:
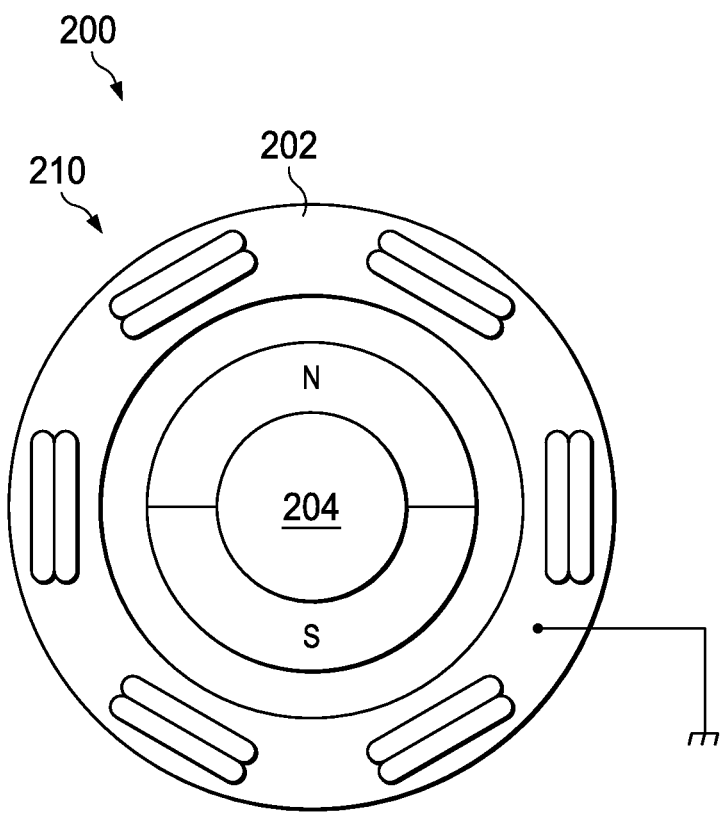
FIG. 2A illustrates an in-runner motor for driving a propeller assembly in one or more examples.
Figure 2B:
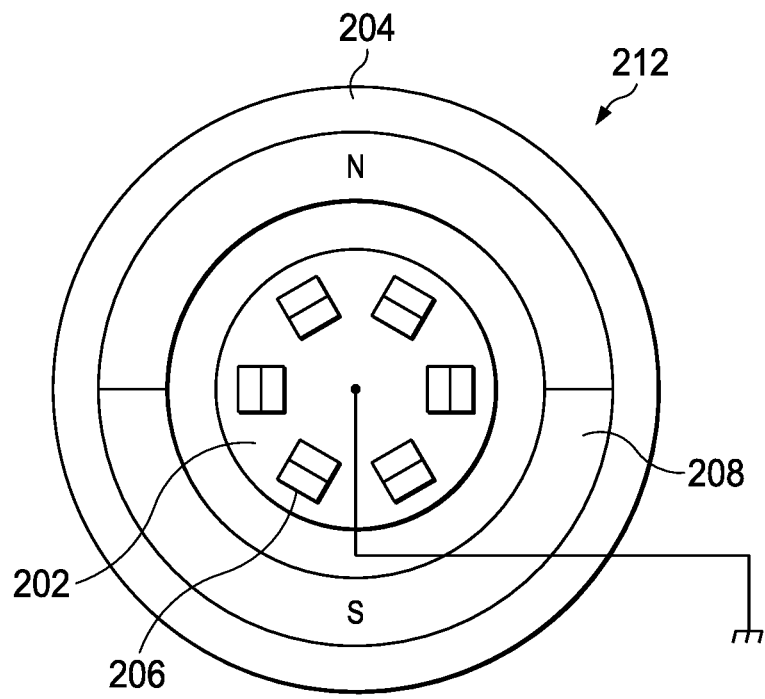
FIG. 2B illustrates an out-runner motor for driving a propeller assembly in on or more examples.

FIGS. 2A and 2B illustrate example motors 200 outputting a propeller torque driving the propellers with an angular velocity during a thrust generating mode. The motors 200 each comprise a stator 202 and a rotor 204, wherein the stator 202 comprises windings 206 and the rotor 204 comprises permanent magnets 208. A current passed through the windings generates a stator magnetic field interacting with the rotor magnetic field of the permanent magnets, causing the rotor to rotate relative to the stator and drive the propeller with the propeller torque (when the propeller is operably connected to the rotor). FIG. 2A illustrates an example of the motor comprising an in-runner motor 210 wherein the stator surrounds an outside of the rotor and the rotor rotates on an inside of the stator when the stator magnetic field and the rotor magnetic field interact. FIG. 2B illustrates an example of the motor 200 comprising an out-runner motor 212 wherein the rotor 204 surrounds an outside of the stator and rotates around the stator when the stator magnetic field and rotor magnetic field interact.

FIGS. 3A-6C illustrate example propeller assemblies 300, 300a, 300b, 300c, 300d including the propellers 112. The propeller assemblies each comprise a rotating assembly 302, including one or more propellers 112, a non-rotating member 306 connected to rotating assembly 302 so that the rotating assembly rotates about a rotational axis 308 relative to the non-rotating member 306; and one or more pairs 307 of magnets comprising a first magnet 310 mounted to the rotating assembly and a second magnet 312 mounted to the non-rotating member 306. The second magnet forms an attractive magnetic interaction 316 with the first magnet 310 along an alignment direction 318. In one or more examples, the alignment direction 318 is along the direction of airflow 124 during horizontal flight 125. One or more distances 320 along the alignment direction 318 between the first magnet and the second magnet are adjusted so that:

(1) the attractive magnetic interaction 318 induces alignment 322 of the propeller 112 in a stowed configuration 118 when the propeller has an angular velocity 326 (about the rotational axis) reduced below a predetermined value; and (2) the propeller torque 328, outputted from a motor 200 and driving the propeller at the angular velocity 326 greater than the predetermined value, is greater than a force applied to the rotating assembly by the attractive magnetic interaction 316.

As used herein, two or more components may be described as being coupled or connected to one another. The desired definition is that element A coupled to/connected to B is defined as either A directly or indirectly connected to B, including coupled or connected through one or more intervening elements.

Example Propeller Assemblies and Deployment

1. Example Configurations Driven by Out-Runner Motors

FIGS. 3A-5B illustrate propeller assemblies 300 driven by an out-runner motor 212. The out-runner motor 212 has an inner case 332 and an outer case 334 rotatably coupled to the inner case via bearings 336. The inner case 332 is fixed to and houses the stator 202, and the outer case 334 is fixed to and houses the rotor 204. The rotating assembly 302 includes the outer case 334 of the motor 200. The rotation of the rotor 204 about the rotational axis 308 (in response to the stator magnetic field interacting with rotor magnetic field) is supported by the bearings 336. Although FIGS. 3A-5B illustrate the non-rotating member 306 of the propeller assembly 300 mounted to a boom 330 or mounting arm (going forward and/or aft and attached to the wing to hold the motors) on the aircraft, in other examples, the propeller assembly is mounted to other parts or aircraft structures of the aircraft 100 including, but not limited to, the fuselage 102 or wing 104. In the example shown, the non-rotating member comprises 306 the inner case 332 of the motor and the inner case 332 is fixedly mounted to the boom or other part of the aircraft.

In one or more examples, the magnetic torque is distributed over several pairs of magnets. FIG. 3C illustrates a configuration wherein the pairs 307 of magnets comprise a first pair 307a and a second pair 307b. The first magnet 310 in the first pair 307a is first mounted at a first position P1 on the rotating assembly 302 (specifically, P1 is on the outer case 334), and the second magnet 312 in the first pair 307a is mounted at a second position P2 on the non-rotating member 306. The second magnet 314 in the second pair 307b is mounted at a third position P3 on the non-rotating member 306, so that the third position P3 and the second position P2 are on diametrically opposite sides of the rotational axis 308 (180 degrees from each other). The first magnet 311 in the second pair 307b is mounted at a fourth position P4 on the rotating assembly 302 (specifically, P4 is on the outer case 334), so that the first position P1 and fourth position P4 are on diametrically opposite sides of the rotational axis 308 (180 degrees from each other). In each pair of magnets, the second magnet 312, 314 is mounted at position P2, P3 so that the second magnet 312, 314 is facing the respective first magnet 310, 311 in the pair when the first magnet 310, 311 and the second magnet 312, 314 are aligned along the alignment direction. In the example shown, the second magnet 312, 314 is mounted on (or on a mount or mounting plate connected to) the boom or other part of the aircraft on which the non-rotating member 302 is mounted. In the example shown, the first magnet 310, 311, the second magnet 312, 314 are each sized to fit in an area having a width 344 smaller than a largest width 346 of the propeller.

The propeller assembly 300 further comprises one or more mechanisms 338 adjustably mounting the second magnet 312 to the non-rotating member 306. The mechanisms enable movement of the second magnet 312 along the alignment direction 318 and are configurable to fix or hold the second magnet to the non-rotating member 306 at the one or more distances 320. Example mechanisms include, but are not limited to, a lever (e.g., a hinge), a spring, a translation stage, or linear mount. In some examples, the mechanism is configured to move the first magnet away from the second magnet in response to a centrifugal force F acting on the mechanism 338, the centrifugal force generated by the rotating assembly 302 rotating about the rotational axis 308 so that the propeller 112 rotates at the angular velocity greater than the predetermined value. In yet further examples, the centrifugal force F moves the first magnet 310 away to reduce or eliminate the attractive magnetic interaction 316 during thrust generating operation of the propeller assembly 300, so that the attractive magnetic interaction only provides locking and/or alignment torque when the propeller has an angular velocity below the predetermined value (or when the motor does not output propeller torque).

When the angular velocity 326 is reduced below the predetermined value, the centrifugal force is eliminated or reduced below a threshold level and the mechanism allows retraction of the first magnet 310 back to a position such that the attractive magnetic interaction 316 overcomes the centrifugal force (if any) and aligns, holds and/or retains the propeller 112 along the alignment direction 318 in the stowed configuration 118 (e.g., during forward cruising 134, forward flight, or horizontal flight). In one or more examples, the centrifugal force F is generated by the rotating assembly 302 when the motor 200 outputs propeller torque to the propeller 112 to propel the aircraft, e.g. during transitioning, vertical takeoff, and vertical landing segments, thereby deploying the propeller away from the stowed configuration 118 and into a deployed configuration 116.

a. Example Configuration Including a Linear Mount

Figure 3A:
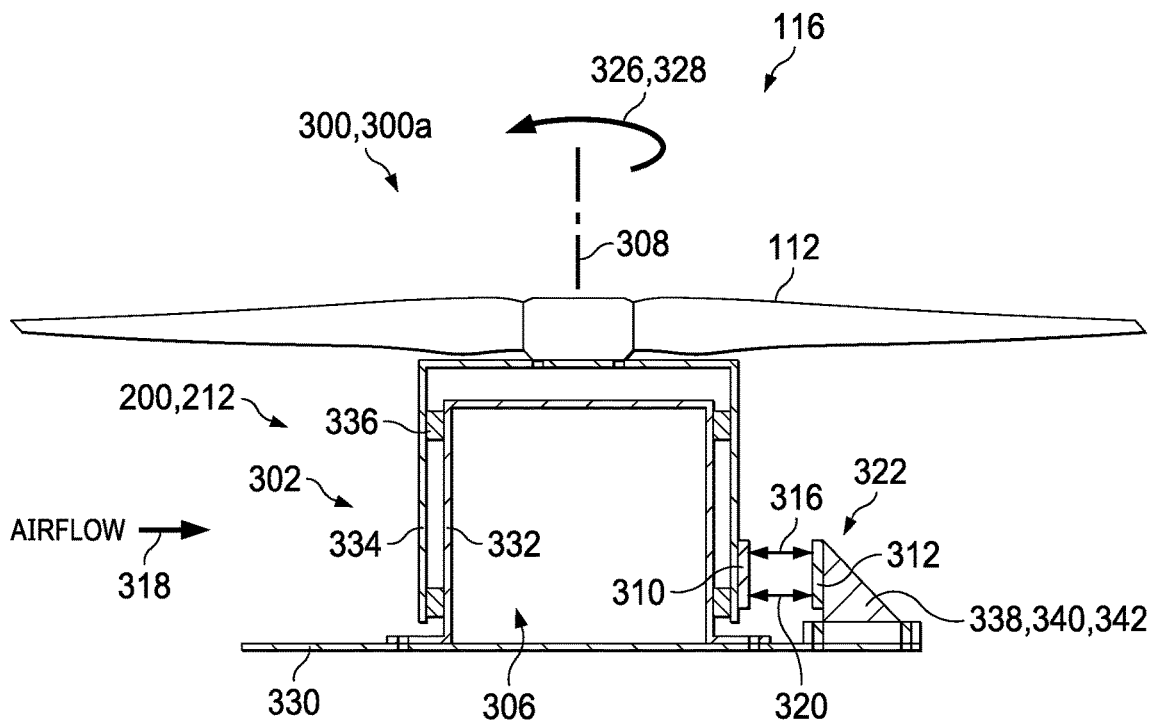
Figure 3B:
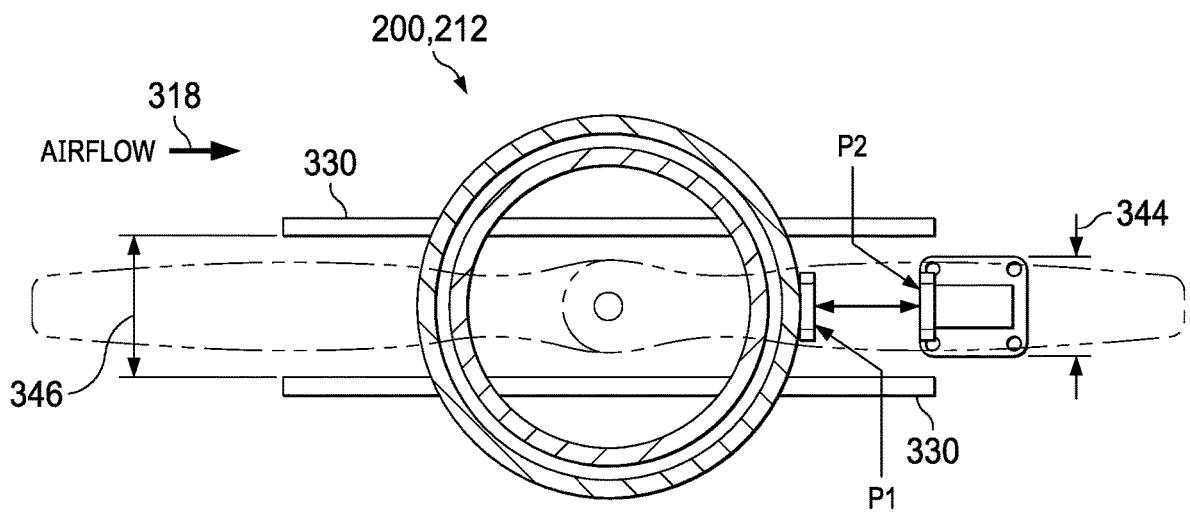
Figure 3C:
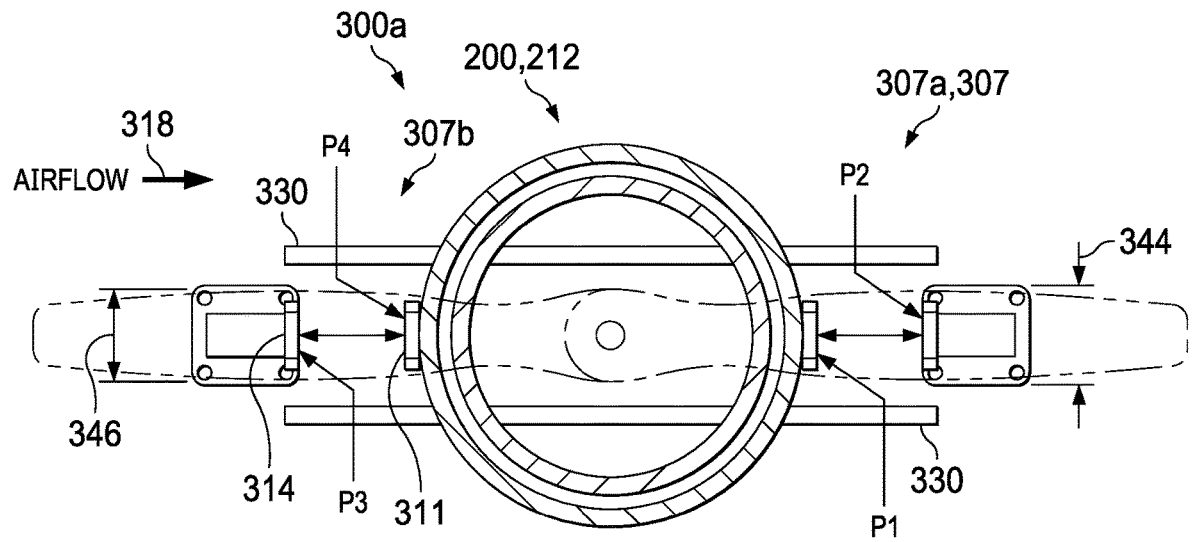

FIGS. 3A-3B illustrate the propeller assembly 300a driven by a motor 200 (e.g., out-runner motor 212) and wherein the second magnet is mounted on a mechanical mount 340 comprising a linear mount 342 (e.g., rail, translation mount, or translation stage) allowing a linear translation of the second magnet 312 along the alignment direction 318. The first magnet is fixedly connected (e.g., bonded) to an outside surface of the outer case 334 of the motor 200.

b. Example Configuration Including a Spring

Figure 4A:
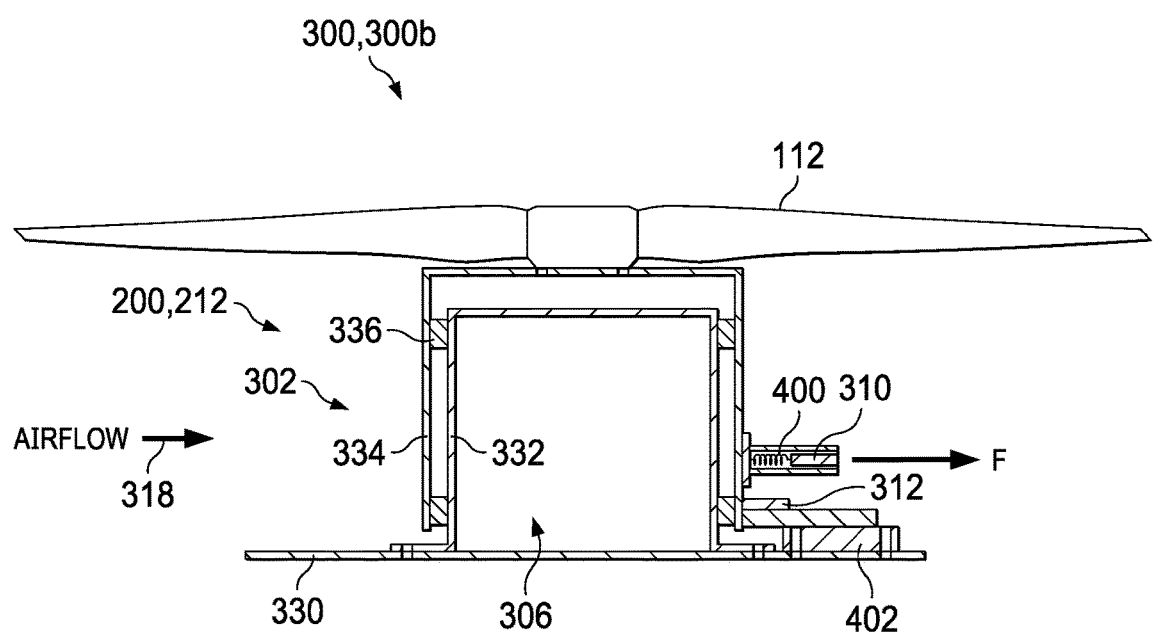
Figure 4B:
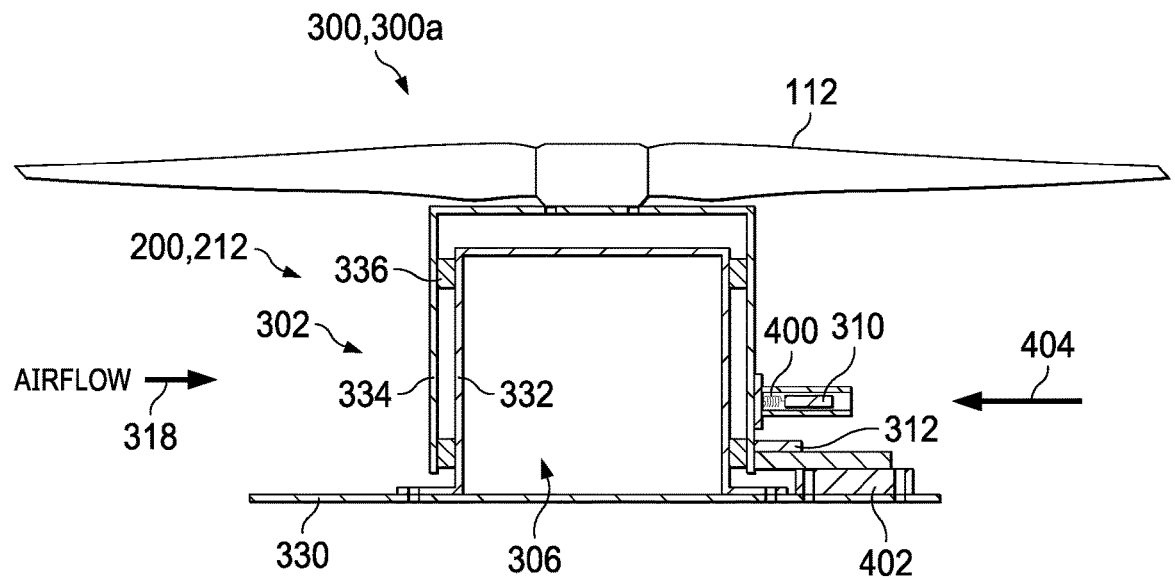
Figure 4C:
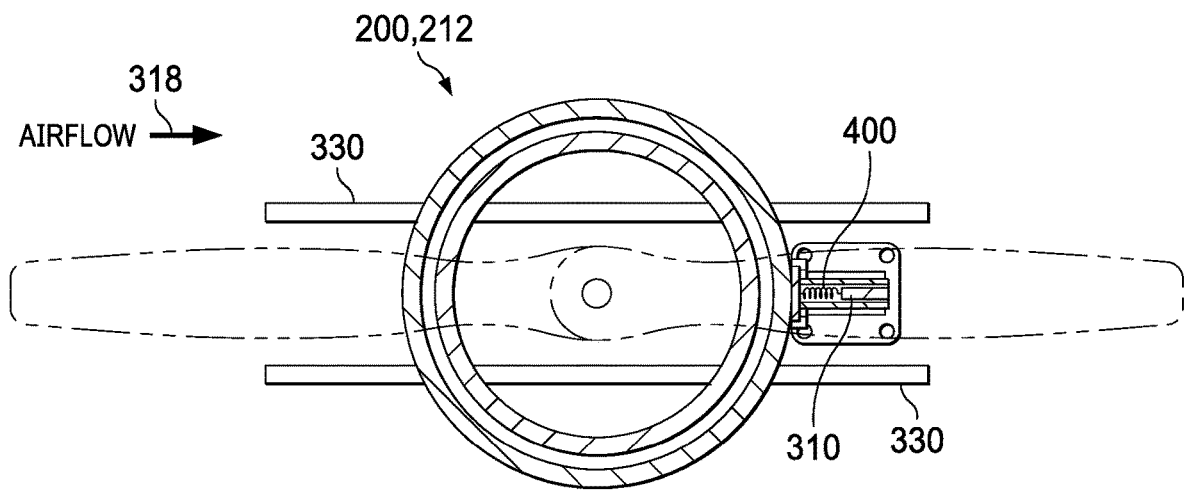

FIG. 4A illustrates an example propeller assembly 300b driven by a motor 200 (e.g., out-runner motor 212) and including a spring 400 coupling the first magnet 310 to the rotating assembly 302. The second magnet 314 is (e.g., fixedly) mounted or connected to the non-rotating member 306 using a mount 402. As illustrated in FIG. 4A, the spring 400 extends so as to move the first magnet 310 away from the second magnet 312 in response to a centrifugal force F generated by the rotating assembly 302 rotating about the rotational axis 308 so that the propeller has the angular velocity 326 greater than the predetermined value. As illustrated in FIG. 4B, when the angular velocity 326 is reduced below the predetermined value, the spring 400 contracts and has a bias force 404 or tension configured to bias the first magnet 310 at a position such that the attractive magnetic interaction 316 aligns, holds and/or retains the propeller 112 in the stowed configuration 118. FIG. 4C is a top view of the propeller assembly showing the spring extended in response to the centrifugal force.

When the angular velocity 326 is reduced below the predetermined value, the centrifugal force is eliminated or reduced below a threshold level and the mechanism allows retraction of the first magnet 310 back to a position such that the attractive magnetic interaction 316 overcomes the centrifugal force (if any) and aligns, holds and/or retains the propeller 112 along the alignment direction 318 in the stowed configuration 118 (e.g., during forward cruising 134, forward flight, or horizontal flight). In one or more examples, the centrifugal force F is generated by the rotating assembly 302 when the motor 200 outputs propeller torque to the propeller 112 to propel the aircraft, e.g. during transitioning, vertical takeoff, and vertical landing segments, thereby deploying the propeller away from the stowed configuration 118 and into a deployed configuration 116.

Figure 4D:
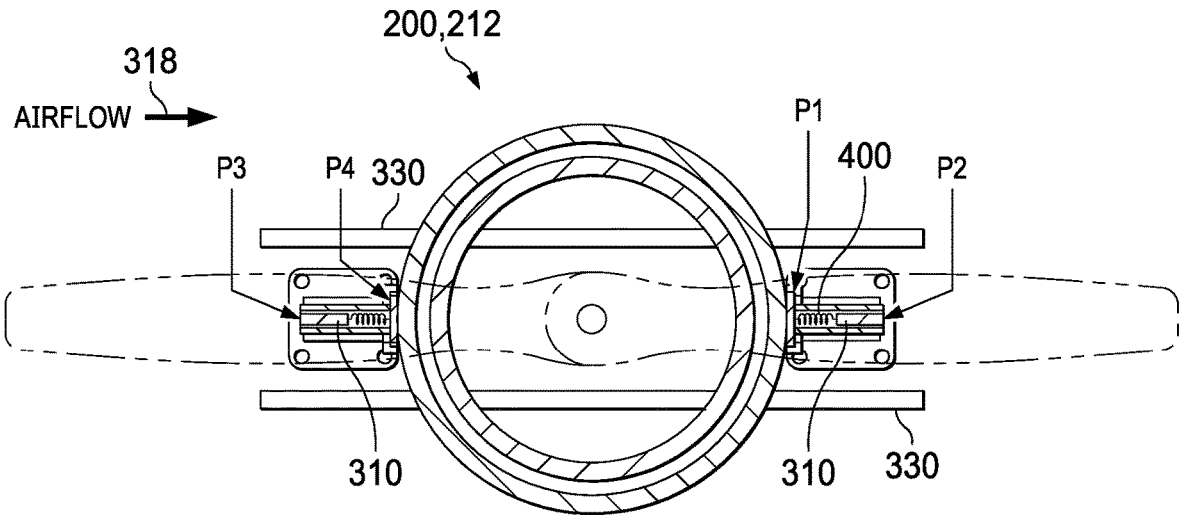

FIG. 4D illustrates a configuration wherein the pairs 307 of magnets comprise a first pair 307a and a second pair 307b. The first magnet 310 in the first pair is first mounted at a first position P1 on the rotating assembly 302 (specifically, P1 is on the outer case 334), and the second magnet 312 in the first pair is mounted at a second position P2 on the non-rotating member 306. The second magnet 312 in the second pair is mounted at a third position P3 on the non-rotating member 306, so that the third position P3 and the second position P2 are on diametrically opposite sides of the rotational axis 308. The first magnet 310 in the second pair 307b is mounted at a fourth position P4 on the rotating assembly 302 (specifically, P4 is on outer case 334), so that the first position P1 and fourth position P4 are on diametrically opposite sides of the rotational axis 308. In each pair of magnets, the second magnet 312 is at position P2 or P3 facing the first magnet when the spring 400 contracts and the first magnet 310 is at a position such that the attractive magnetic interaction 316 aligns, holds and/or retains the propeller 112 in the stowed configuration 118. In the example shown, the second magnet 310 is mounted on (or on a mount or mounting plate connected to) the boom or other part of the aircraft on which the non-rotating member 302 is mounted.

c. Example Configuration Including a Hinge

Figure 5A:
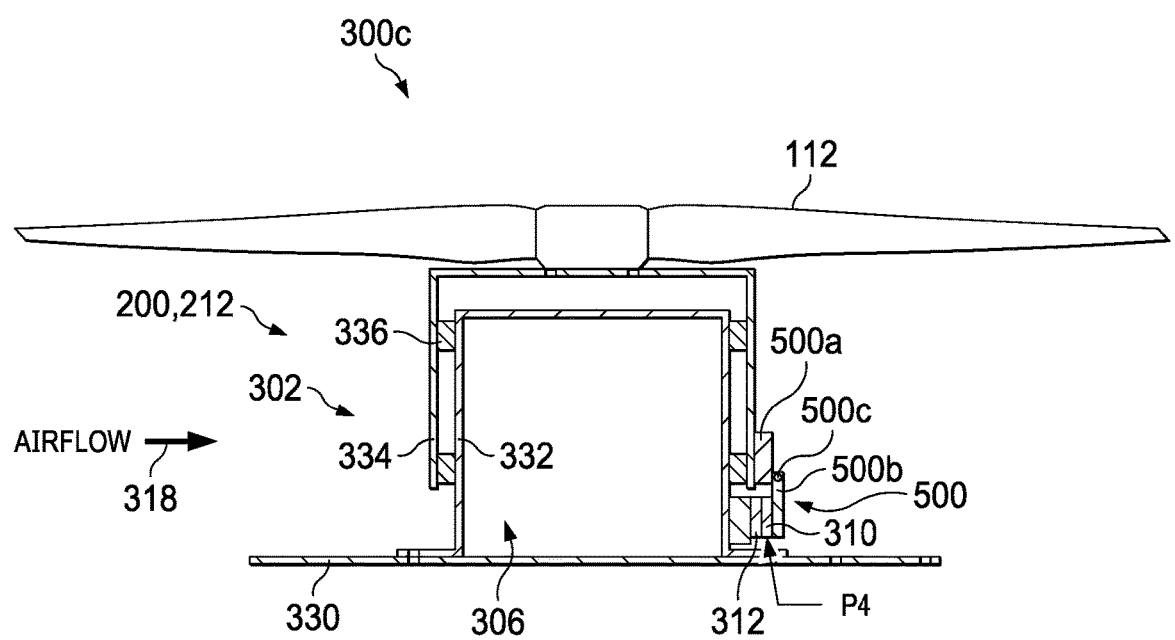

FIG. 5A illustrates an example propeller assembly 300c driven by a motor 200 (e.g., out-runner motor 212) and including a hinge 500 coupling the first magnet to the rotating assembly. In one or more examples, the hinge includes a first leaf (comprising a mounting plate or base 500a) connected to the rotating assembly, a second leaf (or arm 500b) connected to and holding the first magnet, and joint 500c connecting the first leaf to the second leaf so that the second leaf pivots moves relative to the first leaf by pivoting about the joint. In one or more examples, the joint comprises a first knuckle comprising a first hollow cylinder connected to the first leaf, a second knuckle comprising a second hollow cylinder connected to the second leaf, and a pin passing through the first hollow cylinder and the second hollow cylinder so as to rotatably couple the first leaf and the second leaf.

Figure 5B:
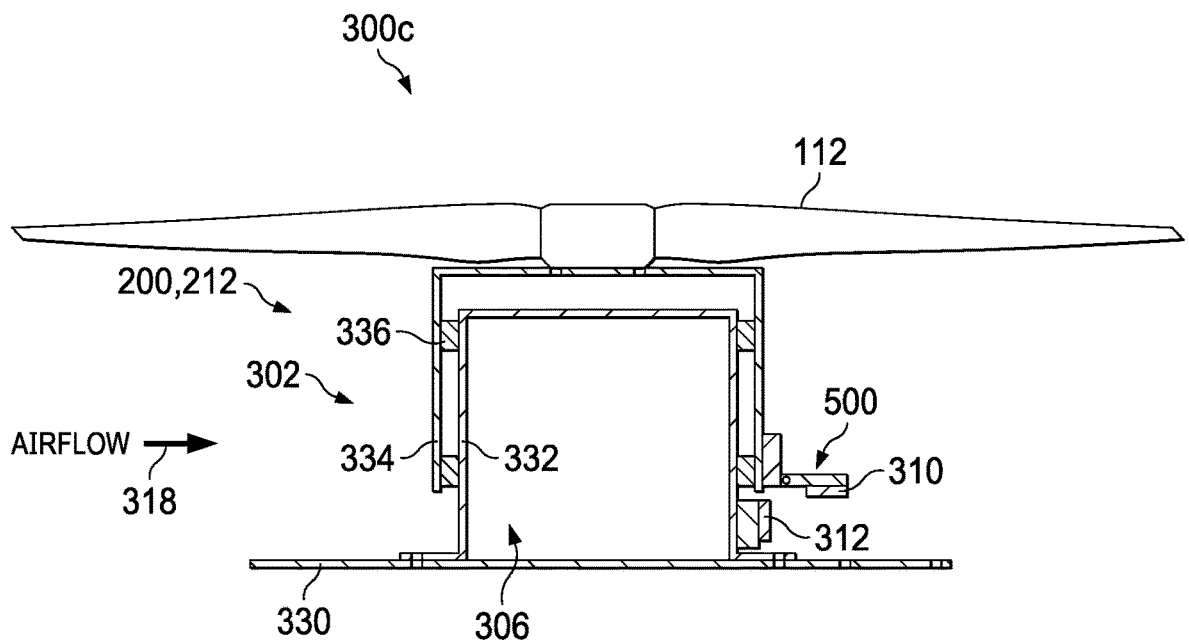

As illustrated in FIG. 5A, the hinge 500 pivots and/or retracts the first magnet 310 away from the second magnet 312 in response to a centrifugal force F generated by the rotating assembly 302 rotating about the rotational axis 308 so that the propeller has the angular velocity 326 greater than the predetermined value. As illustrated in FIG. 5B, when the angular velocity 326 is reduced below a predetermined value, the hinge 500 moves by pivoting the first magnet 310, or allowing the first magnet to fall back, to a position such that the attractive magnetic interaction aligns, holds, or retains the propeller in the stowed configuration 118.

When the angular velocity 326 is reduced below the predetermined value, the centrifugal force is eliminated or reduced below a threshold level and the mechanism allows retraction of the first magnet 310 back to a position such that the attractive magnetic interaction 316 overcomes the centrifugal force (if any) and aligns, holds and/or retains the propeller 112 along the alignment direction 318 in the stowed configuration 118 (e.g., during forward cruising 134, forward flight, or horizontal flight). In one or more examples, the centrifugal force F is generated by the rotating assembly 302 when the motor 200 outputs propeller torque to the propeller 112 to propel the aircraft, e.g. during transitioning, vertical takeoff, and vertical landing segments, thereby deploying the propeller away from the stowed configuration 118 and into a deployed configuration 116.

Figure 5C:
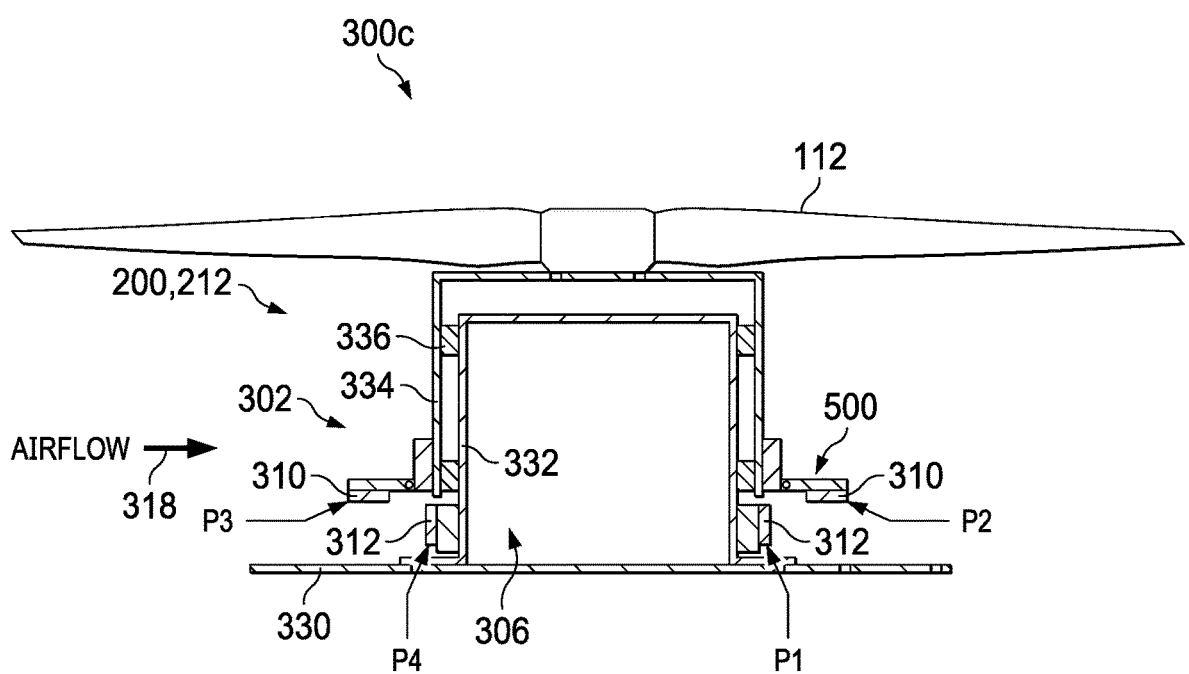

FIG. 5C illustrates a configuration wherein the pairs 307 of magnets comprise a first pair 307a and a second pair 307b. The first magnet 310 in the first pair is first mounted at a first position P1 on the rotating assembly 302 (specifically, P1 is on the outer case 334), and the second magnet 312 in the first pair is mounted at a second position P2 on the non-rotating member 306. The second magnet 312 in the second pair is mounted at a third position P3 on the non-rotating member 306, so that the third position P3 and the second position P2 are on diametrically opposite sides of the rotational axis 308. The first magnet 310 in the second pair 307b is mounted at a fourth position P4 on the rotating assembly 302 (specifically P4 is on the outer case 334), so that the first position P1 and fourth position P4 are on diametrically opposite sides of the rotational axis 308.

In each pair of magnets, the second magnet 312 is at position P2 or P3 facing the first magnet when the hinge pivots back positioning the first magnet 310 such that the attractive magnetic interaction 316 aligns, holds and/or retains the propeller 112 in the stowed configuration 118. In the example shown, the outer case 334 does not extend over the entire inner case 332 and the second magnet 310 in each pair is mounted on a portion of the inner case 332 that is exposed (or not concealed by the outer case 334).

2. Configurations Including an In-Runner Motor

Figure 6A:
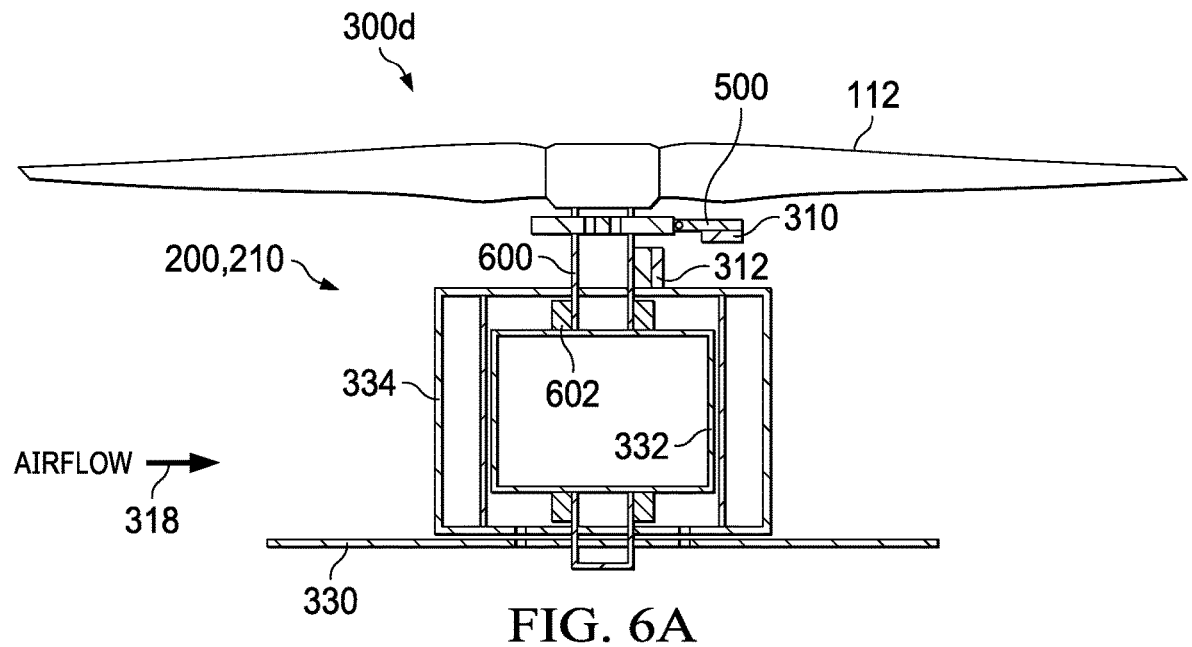
Figure 6B:
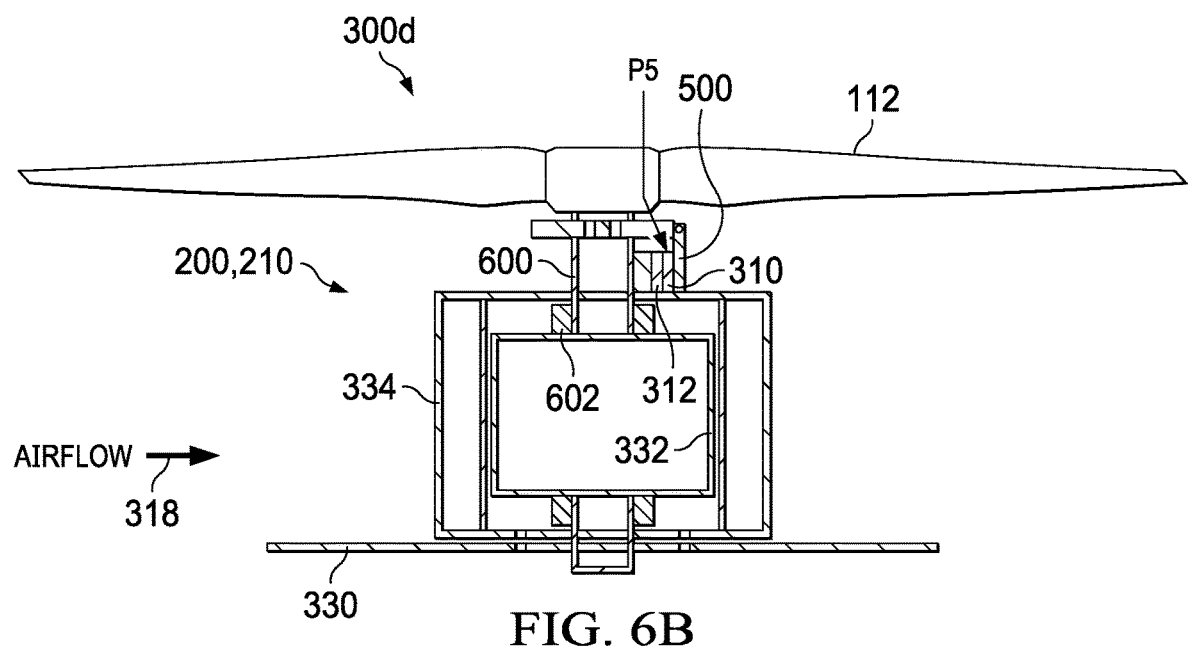

FIG. 6A-6B illustrate an example propeller assembly 300d driven by the in-runner motor 210 and including a mechanism 338 coupling the first magnet 310 to the rotating assembly 302. The in-runner motor 212 has an inner case 332 and an outer case 334. Example mechanisms 338 include, but are not limited to, a lever, a joint, or a hinge. In the example of FIG. 6A-6B, a hinge 500 mounts the first magnet to a shaft 600 driven by the motor and coupling the propeller 112 to the motor. The rotating assembly 302 includes, or is coupled to, the shaft. The non-rotating member 306 includes the outer case 334 of the motor 200 fixedly mounted to the boom or other part of the aircraft. As illustrated in FIG. 6A, the hinge 500 pivots the first magnet away from the second magnet 312 in response to a centrifugal force F generated by the rotating assembly 302 rotating about the rotational axis 308 so that the propeller has the angular velocity greater than the predetermined value. As illustrated in FIG. 6B, when the angular velocity 326 is reduced below the predetermined value, the hinge 500 holds the first magnet 310 at a position P5 wherein the attractive magnetic interaction is configured to hold the propeller 112 in the stowed configuration. In this example, the outer case of the motor 200 houses the stator and is fixed to (or stationary relative to) to the non-rotating member. The motor's rotor is rotatably coupled to the shaft 600 via bearings 602 and rotor transfers the propeller torque 328 to the shaft via the bearings 602.

Figure 6C:
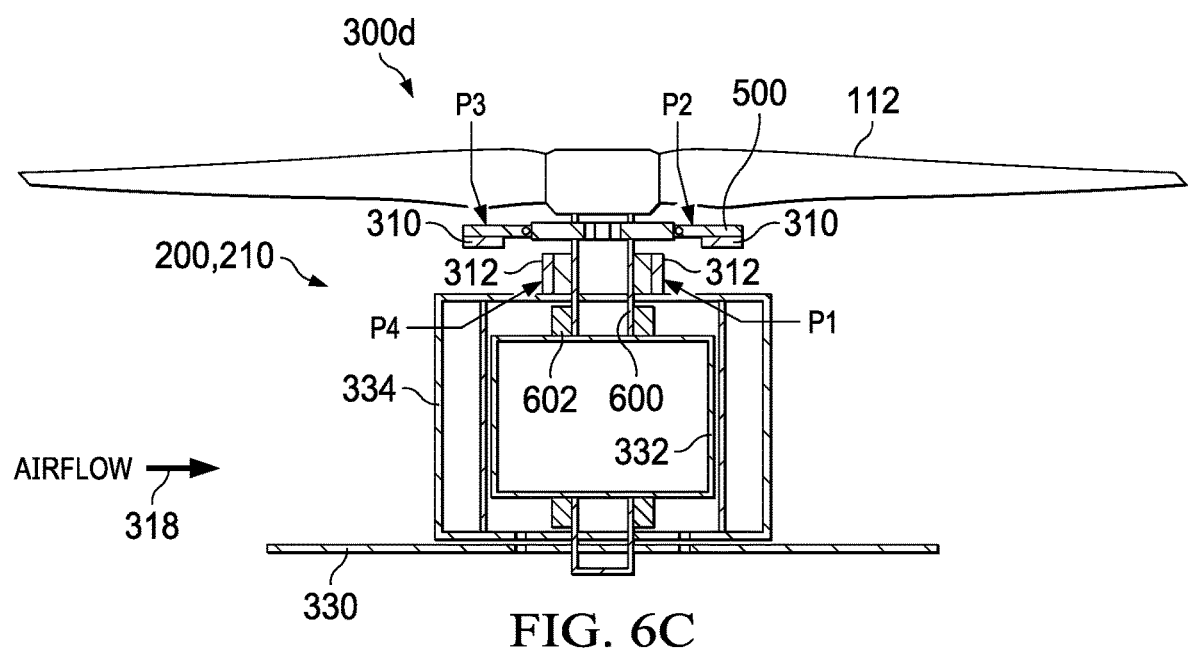

FIG. 6C illustrates a configuration wherein the pairs 307 of magnets comprise a first pair 307a and a second pair 307b. The first magnet 310 in the first pair is first mounted at a first position P1 on the rotating assembly 302 (e.g., P1 is on the shaft 600), and the second magnet 312 in the first pair is mounted at a second position P2 on the non-rotating member 306 (specifically, P2 is on the outer case 334 of the motor). The second magnet 312 in the second pair is mounted at a third position P3 on the non-rotating member 306 (P3 is on the outer case 334), so that the third position P3 and the second position P2 are on diametrically opposite sides of the rotational axis 308. The first magnet 310 in the second pair 307b is mounted at a fourth position P4 on the rotating assembly 302 (P4 is on the shaft 600), so that the first position P1 and fourth position P4 are on diametrically opposite sides of the rotational axis 308.

Example Operation of an Aircraft Including a Propeller Assembly

As illustrated in FIG. 1A-1B, propeller assemblies 300 according to embodiments described herein, for example in FIGS. 3A-C, 4A-D, 5A-C, and 6A-C, are operably connected to an aircraft 100 comprising a fuselage 102 and a wing 104 (connected to the fuselage). The aircraft 100 further includes (or is coupled to) computer coupled to the motor 200. FIG. 1A illustrates the computer is configurable to command the motor 200 to output a propeller torque driving the propeller at the angular velocity greater than the predetermined value so that the propeller torque is greater than a force applied to the rotating assembly by the attractive magnetic interaction.

FIG. 1B illustrates the computer is further configurable to command the motor 200 to decrease the angular velocity below the predetermined value so that the attractive magnetic interaction holds the propeller in a stowed configuration when the aircraft is cruising or moving in horizontal flight 125. In various examples, the propeller comprises one or more propeller blades 120 having a longitudinal axis 122, and the longitudinal axis in the stowed configuration is substantially aligned along a horizontal direction 123 (e.g., parallel to a longitudinal axis of the aircraft or the direction of horizontal flight or direction of forward flight) so as to reduce a drag of the propeller when the aircraft is moving during the horizontal flight 125. As illustrated in FIG. 1B, substantially aligned is defined as the longitudinal axis 122 and the horizontal direction 123 being parallel or the longitudinal axis being at an angle within 5 degrees of the horizontal direction 123.

In one or more further examples, the one or more distances are adjusted to account for airflow impinging on, or other aerodynamic forces on, the propeller blades that cause the longitudinal axis 122 to move into alignment with the alignment direction. In yet other examples, the motor is used to rotate the rotating assembly so as to engage the attractive magnetic interaction between the first magnet and the at least one of the second magnet or third magnet.

FIG. 1B further illustrates the aircraft 100 comprises an additional propulsor including a propeller 114 operationally connected to the fuselage 102 for providing the aircraft 100 with the thrust propelling the aircraft during horizontal flight 125.

Although the Figures illustrate embodiments wherein the alignment direction in the stowed configuration is along the airflow direction, in other examples, the alignment direction for stopping the propeller is at the discretion of the designer to reduce forces or at any angle the designer chooses.

Although FIG. 1A-1B illustrate examples wherein the propellers include 6 propeller blades and FIGS. 3A-6 illustrate examples wherein the propeller assemblies each include two propeller blades, in other examples, any number of propeller blades (per propeller assembly or in total) or propeller assemblies are implemented.

Fifth Example: Process Steps

Method of Making

Figure 7:
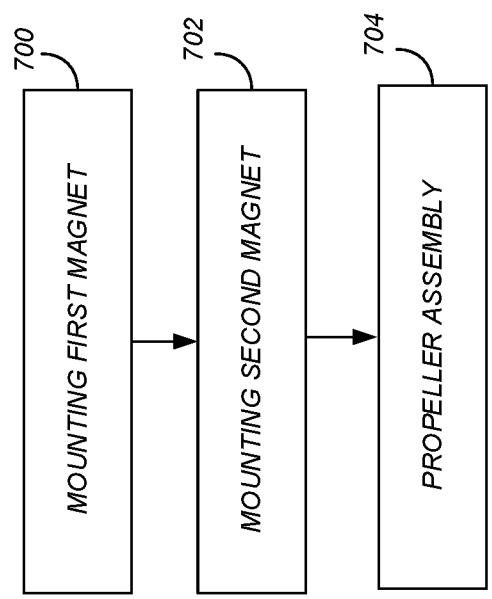
FIG. 7 is a flowchart illustrating a method of making a propeller assembly according to one or more examples described herein.

FIG. 7 is a flowchart illustrating a method of making a propeller assembly according to one or more examples (referring also to FIGS. 1A-6B)

Block 700 represents mounting a first magnet to a rotating assembly. In one or more examples, the step comprises mounting the first magnet using a mechanism (e.g., a metal spring or hinge) connected to the rotating assembly, wherein the mechanism is configured to move the first magnet away from the rotating assembly in response to a centrifugal force acting on the mechanism (the centrifugal force generated by the rotating assembly rotating about a rotational axis at the angular velocity greater than the predetermined value). The rotating assembly includes one or more propellers each comprising one or more propeller blades having a longitudinal axis.

Block 702 represents mounting a second magnet to a non-rotating member, so that the second magnet forms an attractive magnetic interaction with the first magnet along an alignment direction when the rotating assembly is rotatably connected to the non-rotating member so as to rotate about a rotational axis relative to the non-rotating member. In one or more examples, the step includes mounting the first magnet and/or the second magnet using one or more mounts that allow adjustment of one or more distances (e.g., shortest distances) along the alignment direction between the first magnet and at least one of the second magnet or the third magnet so that (1) the attractive magnetic interaction induces alignment of the propeller in a stowed configuration when the angular velocity is reduced below a predetermined value, and (2) a propeller torque, outputted from a motor and driving the propeller at the angular velocity greater than the predetermined value, is greater than a force applied to the rotating assembly by the attractive magnetic interaction. In one or more examples, the mounts or mechanisms mounting the magnets comprise non metallic materials and/or 3D printed parts.

In one or more examples, at least one of the first magnet or the second magnet comprise Neodynium Yag permanent magnets. In one or more further examples, at least one of the first magnet or the second magnet have a diameter of 1 cm or less and a thickness of 5 mm or less. In yet further examples, the first magnet has a first pole and the second magnet has a second pole magnetically attracted to the first pole and facing the first pole in the stowed configuration. In one or more examples, the distances 320 include the shortest distances between a first face of the first magnet and a second face of the second magnet. In some examples, multiple pairs of magnets are mounted.

Block 704 represents the end result, a propeller assembly 300. Illustrative, non-exclusive examples of inventive subject matter according to the present disclosure are described in the following enumerated paragraphs:

A1. A propeller assembly (300), comprising:
- a rotating assembly (302) comprising a propeller (112), the rotating assembly (302) rotatably connected to a non-rotating member (306) so as to rotate about a rotational axis (308) relative to the non-rotating member (306);
- one or more pairs (307) of magnets comprising a first magnet (310) mounted to the rotating assembly (302) and a second magnet (312) mounted to the non-rotating member (306), the second magnet (312) forming an attractive magnetic interaction (316) with the first magnet (310) along an alignment direction (318); and wherein:
- one or more distances (320) along the alignment direction (318) between the first magnet (310) and the second magnet (312) are adjusted so that:
  - the attractive magnetic interaction (316) induces alignment (322) of the propeller (112) in a stowed configuration (118) when an angular velocity (326) of the propeller (112, 114) is reduced below a predetermined value, and
  - a propeller torque (328), outputted from a motor (200) and driving the propeller (112) at the angular velocity (326) greater than the predetermined value, is greater than a force applied to the rotating assembly (302) by the attractive magnetic interaction (316).

A2. The propeller assembly (300) of paragraph A1, wherein:
- the one or more pairs (307) of magnets comprise a first pair (307a) and a second pair (307b),
- the first magnet (310) in the first pair (307a) is mounted at a first position (P1) on the rotating assembly (302),
- the second magnet (312) in in the first pair (307a) is mounted at a second position (P2) on the non-rotating member (306),
- the second magnet (312) in the second pair (307b) is mounted at a third position (P3) on the non-rotating member (306), the third position (P3) and the second position (P2) on diametrically opposite sides of the rotational axis (308), and
- the first magnet (310) in the second pair (307b) is mounted at a fourth position (P4) on the rotating assembly (302), the fourth position (P4) and the first position (P1) on diametrically opposite sides of the rotational axis (308).

A3. The propeller assembly (300) of paragraph A1 or A2, wherein the first magnet (310) and the second magnet (312) are each sized to fit in an area having a width (344) smaller than a largest width (346) of the propeller (112).

A4. The propeller assembly (300) of any of the paragraphs A1-A3, wherein:
- the first magnet (310) has a first pole, and
- the second magnet (312) has a second pole magnetically attracted to the first pole and facing the first pole in the stowed configuration (118).

A5. The propeller assembly (300) of any of the paragraphs A1-A4, wherein:
- the motor (200) comprises an out-runner motor (212) comprising a stator (202) and a rotor (204) and the rotating assembly (302) comprises the rotor (204) coupled to the propeller (112), or
- the motor (200) comprises an in-runner motor (210), the rotating assembly (302) comprises a shaft (600) coupled to the propeller (112), and the motor (200) drives the propeller (112) via the shaft (600).

A6. The propeller assembly (300) of any of the paragraphs A1-A5, further comprising one or more mechanisms (338) adjustably mounting the second magnet (312) to the non-rotating member (306), wherein the mechanisms (338) enable movement of the second magnet (312) along the alignment direction (318) and fix the second magnet (312) to the non-rotating member (306) at the one or more distances (320).

A7. The propeller assembly (300) of paragraph A6, wherein the one or more mechanisms (338) comprise a linear rail or linear mount (342) allowing linear translation of the second magnet (312) along the alignment direction (318).

A8. The propeller assembly (300) of any of the paragraphs A1-A6, further comprising a mechanism (338) connected to the rotating assembly (302) and comprising the first magnet (310), the mechanism (338) configured to move the first magnet (310) away from the second magnet (312) in response to a centrifugal force (F) acting on the mechanism (338), the centrifugal force (F) generated by the rotating assembly (302) rotating about the rotational axis (308) so that the propeller (112) has the angular velocity (326) greater than the predetermined value.

A9. The propeller assembly (300) of paragraph A8, wherein:
- the motor (200) comprises an in-runner motor (210),
- the rotating assembly (302) comprises a shaft (600) connected to the propeller (112),
- the motor (200) drives the propeller (112) via the shaft (600), and
- the mechanism (338) is mounted to the shaft (600).

A10. The propeller assembly (300) of any of the paragraphs A1-A5, further comprising a spring (400) coupling the first magnet (310) to the rotating assembly (302), the spring (400):
- extending so as to move the first magnet (310) away from the second magnet (312) in response to a centrifugal force (F) generated by the rotating assembly (302) rotating about the rotational axis (308) so that the propeller (112) has the angular velocity (326) greater than the predetermined value; and
- having a bias force (404) configured to bias the first magnet (310) at a position wherein the attractive magnetic interaction (316) is configured to hold the propeller (112) in the stowed configuration (118) when the angular velocity (326) is reduced below the predetermined value.

A11. The propeller assembly (300) of any of the paragraphs A1-A5, further comprising a hinge (500) coupling the first magnet (310) to the rotating assembly (302), the hinge (500):
  pivoting the first magnet (310) away from the second magnet (312) in response to a centrifugal force (F) generated by the rotating assembly (302) rotating about the rotational axis (308) so that the propeller (112) has the angular velocity (326) greater than the predetermined value; and holding the first magnet (310) at a position wherein the attractive magnetic interaction (316) is configured to hold the propeller (112) in the stowed configuration (118) when the angular velocity (326) is reduced below the predetermined value.

A12. The propeller assembly (300) of any of the paragraphs A1-A5, further comprising a lever coupling the first magnet (310) to the rotating assembly (302), the lever having a lever arm (500b):
  moving the first magnet (310) away from the second magnet (312) in response to a centrifugal force (F) generated by the rotating assembly (302) rotating about the rotational axis (308) so that the propeller (112) has the angular velocity (326) greater than the predetermined value; and
  holding the first magnet (310) at a position wherein the attractive magnetic interaction (316) is configured to hold the propeller (112, 114) in the stowed configuration (118) when the angular velocity (326) is reduced below the predetermined value.

A13. An aircraft (100) comprising the propeller assembly (300) of any of the paragraphs A1-A12, further comprising:
  a fuselage (102);
  the propeller (112) assembly operatively connected to the fuselage (102);
  the motor (200) connected to the rotating assembly (302) to rotate the propeller (112); and
  a computer (902) coupled to the motor (200), wherein the computer (902) is configurable to command the motor (200) to:
  output the propeller (112) torque, so that the propeller assembly (300) generates a lift during a vertical flight of the aircraft (100), and
  decrease the angular velocity (326) below the predetermined value so that the attractive magnetic interaction (316) holds the propeller (112) in the stowed configuration (118) when the aircraft (100) is cruising (134) or moving in horizontal flight (125).

A14. The aircraft (100) of claim A13, wherein:
  the propeller (112) comprises one or more propeller blades (120) having a longitudinal axis (122), and
  the longitudinal axis (122) in the stowed configuration (118) is substantially aligned along a horizontal direction (123) of the horizontal flight (125) so as to reduce a drag of the propeller (112) when the aircraft (100) is moving in the horizontal flight (125).

A15. The aircraft (100) of paragraph A14, wherein the one or more distances (320) are adjusted to account for an airflow (124) impinging on the propeller blades moving the longitudinal axis (122) into an alignment (322) with the alignment direction (318).

A16. A propeller assembly (300), comprising:
  a rotating assembly (302) comprising a propeller (112), the rotating assembly (302) rotatably connected to a non-rotating member (306) so as to rotate about a rotational axis (308) relative to the non-rotating member (306);
  a first magnet (310) attached to the rotating assembly (302);
  a second magnet (312) mounted to the non-rotating member (308); and
  a mechanism (338) connected to the rotating assembly (302) and comprising the first magnet (310), the mechanism (338) configured to:
  move the first magnet (310) away from the second magnet (312) in a first configuration in response to a centrifugal force (F) acting on the mechanism (338), the centrifugal force (F) generated by the rotating assembly (302) rotating about the rotational axis (308) so that the propeller (112) has an angular velocity (326) greater than a predetermined value,
  position the first magnet (310) closer to the second magnet (312) in a second configuration when the angular velocity (326) is smaller than the predetermined value, wherein:
  an attractive magnetic interaction (316) between the first magnet (310) and the second magnet (312) in the second configuration induces alignment (322) of the propeller (112) in a stowed configuration (118) when the angular velocity (326) is reduced below the predetermined value, and
  the attractive magnetic interaction (316) between the first magnet (310) and the second magnet (312) in the first configuration is less than a propeller torque (328) outputted from a motor (200) driving the propeller (112) at the angular velocity (326) greater than the predetermined value.

A17. The propeller assembly (300) of paragraph A16, wherein the mechanism (338) comprises a spring (400) coupling the second magnet (312) to the rotating assembly (302), the spring (400):
  extending so as to move the first magnet (310) away from the second magnet (312) in response to the centrifugal force generated by the rotating assembly (302) rotating about the rotational axis (308) so that the propeller (112) has the angular velocity (326) greater than the predetermined value, and
  having a bias force (404) configured to bias the first magnet (310) at a position wherein the attractive magnetic interaction (316) is configured to hold the propeller (112) in the stowed configuration (118) when the angular velocity (326) is reduced below the predetermined value.

A18. The propeller assembly (300) of paragraph A16, further comprising a hinge (500)
  coupling the first magnet (310) to the rotating assembly (302), the hinge (500):
  pivoting the first magnet (310) away from the second magnet (312) in response to the centrifugal force generated by the rotating assembly (302) rotating about the rotational axis (308) so that the propeller (112) has the angular velocity (326) greater than the predetermined value; and
  pivoting the first magnet (310) towards the second magnet (312) to a position wherein the attractive magnetic interaction (316) is configured to hold the propeller (112) in the stowed configuration (118) when the angular velocity (326) is reduced below the predetermined value.

A20. A method of controlling a propeller assembly (300), comprising:
  controlling the propeller assembly (300) wherein the propeller (112) assembly includes:

a rotating assembly (302) comprising a propeller (112), the rotating assembly (302) rotatably connected to a non-rotating member (306) so as to rotate about a rotational axis (308) relative to the non-rotating member (306);

one or more pairs (307) of magnets comprising a first magnet (310) mounted to the rotating assembly (302) and a second magnet (312) mounted to the non-rotating member (306), the second magnet (312) forming an attractive magnetic interaction (316) with the first magnet (310) along an alignment direction (318); and wherein:

one or more distances (320) between the first magnet (310) and the second magnet (312) along the alignment direction (318) are adjusted so that the attractive magnetic interaction (316) induces alignment (322) of the propeller (112) in a stowed configuration (118) when the angular velocity (326) is reduced below a predetermined value; and deploying the propeller (112) away from the stowed configuration (118), comprising outputting a propeller torque (328) from a motor (200) and driving the propeller (112) at the angular velocity (326) greater than the predetermined value so that the propeller torque (328) is greater than a force applied to the rotating assembly (302) by the attractive magnetic interaction (316).

A21. The method of paragraph A20, wherein the propeller torque (328) is used to generate lift during at least one of a take-off, a first transition from take-off to horizontal flight (125), and a second transition between horizontal flight (125) and landing of an aircraft (100) operably connected to the propeller (112) assembly.

A22. The method or propeller assembly of any of the paragraphs A1-A21, wherein the propeller assembly is coupled to the motor (200).

A23. The method or propeller assembly of paragraph A22, wherein the propeller assembly includes the motor (200) or includes a part of the motor (200).

Method of Controlling

Figure 8:
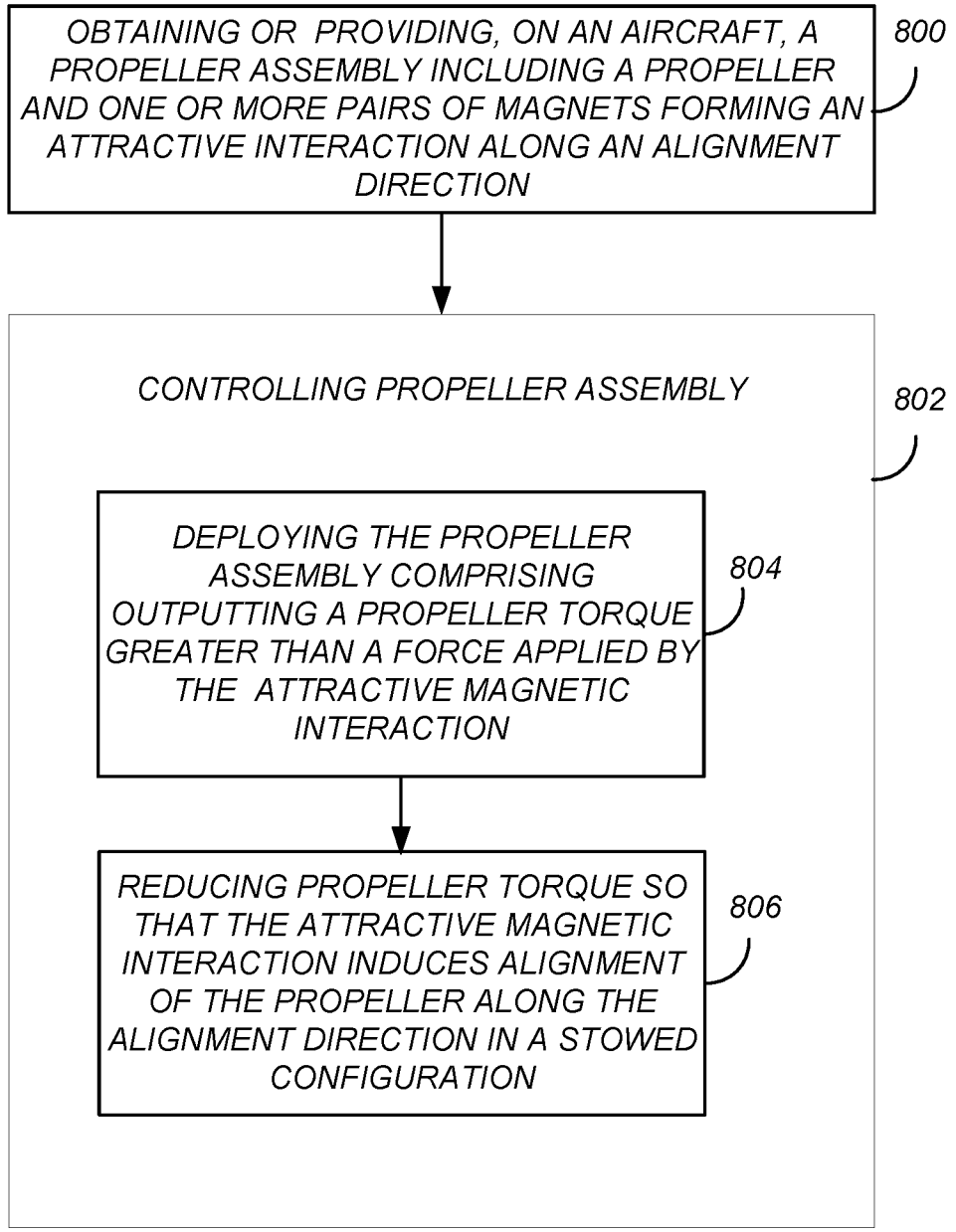
FIG. 8 is a flowchart illustrating a method of operating a propeller assembly according to one or more examples described herein.

FIG. 8 represents a method of controlling a propeller assembly and thrust comprising the following steps.

Block 800 represents obtaining or providing propeller assembly (300) (e.g., as described in any of the paragraphs A1-A19) and including a rotating assembly (302) comprising a propeller (112), the rotating assembly (302) rotatably connected to a non-rotating member (306) so as to rotate about a rotational axis (308) relative to the non-rotating member (306); one or more pairs (307) of magnets comprising a first magnet (310) mounted to the rotating assembly (302) and a second magnet (312) mounted to the non-rotating member (306), the second magnet (312) forming an attractive magnetic interaction (316) with the first magnet (310) along an alignment direction (318); and wherein one or more distances (320) between the first magnet (310) and the second magnet (312) along the alignment direction (318) are adjusted so that the attractive magnetic interaction (316) induces alignment (322) of the propeller (112) in a stowed configuration (118) when the angular velocity (326) is reduced below a predetermined value. Block 802 represents controlling the propeller assembly by controlling output of propeller torque from a motor driving the propeller. In one or more examples, the step comprises deploying 804 the propeller (112) away from the stowed configuration (118), comprising outputting a propeller torque (328) from a motor (200) and driving the propeller (112) at the angular velocity (326) greater than the predetermined value so that the propeller torque (328) is greater than a force applied to the rotating assembly (302) by the attractive magnetic interaction (316). In one or more examples, the propeller torque deploying the propeller is applied during at least one of a take-off, a first transition from take-off to horizontal flight, or during descent or a second transition between horizontal flight and landing. In another example, the controlling comprises reducing 806 the propeller torque so that the angular velocity is below the predetermined value and the attractive magnetic interaction induces alignment of the propeller in a stowed configuration. In one or more examples the predetermined value is 5% of the maximum operating angular velocity for the propeller providing lift during take-off of the aircraft. The angular velocity below the predetermined value deploys the propeller away from the stowed configuration.

Processing Environment

Figure 9:
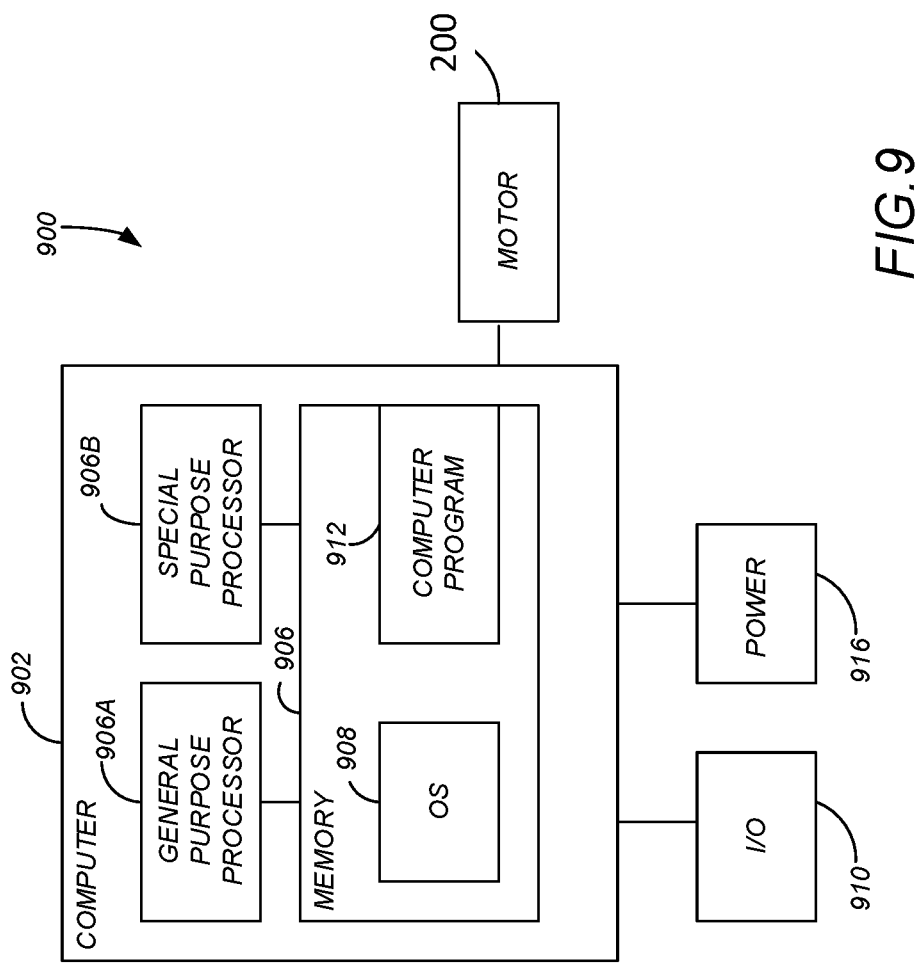
FIG. 9 illustrates a hardware environment for controlling a propeller assembly according to examples described herein.

FIG. 9 illustrates an exemplary system 900 used to implement processing elements needed to control the propeller assembly 300. In other examples, the system 900 is a flight control system used to control propeller torque applied to the propeller assembly that causes deployment or retraction of the propeller(s) as described herein.

The computer 902 comprises a processor 904 (general purpose processor 906A and special purpose processor 906B) and a memory 906, such as random access memory (RAM). Generally, the computer 902 operates under control of an operating system 908 stored in the memory 906, and interfaces with the user/other computers to accept inputs and commands (e.g., analog or digital signals from the crew or flight control system) and to present results through an input/output (I/O) module 910. The computer program application 912 accesses and manipulates data stored in the memory 906 of the computer 902. The operating system 908 and the computer program 912 are comprised of instructions which, when read and executed by the computer 902, cause the computer 902 to perform the operations and/or methods herein described, controlling the motor 200 to control angular velocity of the rotating assembly and thereby opening/deploying and closing/stowing of the propeller assembly 300. In one embodiment, instructions implementing the operating system 908 and the computer program 912 are tangibly embodied in the memory 906, thereby making one or more computer program products or articles of manufacture capable of controlling the propeller torque applied to the propeller assembly as described herein. As such, the terms "article of manufacture," "program storage device" and "computer program product" as used herein are intended to encompass a computer program accessible from any computer readable device or media. Also shown is a source of power 916 for the computer.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the examples of the present disclosure. The foregoing description of the examples has been presented for the purposes of illustration and description. It is not intended to be exhaustive or to limit the disclosure to the precise form disclosed. Many modifications and variations are possible in light of the above teaching. It is intended that the scope of rights be limited not What claimed is:

1. A propeller assembly, comprising:
a rotating assembly comprising a propeller, the rotating assembly rotatably connected to a non-rotating member so as to rotate about a rotational axis relative to the non-rotating member;
one or more pairs of magnets comprising a first magnet mounted to the rotating assembly and a second magnet mounted to the non-rotating member, the second magnet forming an attractive magnetic interaction with the first magnet along an alignment direction; and wherein:
the propeller comprises one or more propeller blades;
in one of the pairs, the first magnet and the second magnet are positioned directly underneath one of the propeller blades in a stowed configuration; and
one or more distances along the alignment direction between the first magnet and the second magnet are adjusted so that:
the attractive magnetic interaction induces an alignment of the propeller in the stowed configuration when an angular velocity of the propeller is reduced below a predetermined value; and
a propeller torque, an output from a motor which drives the propeller at the angular velocity greater than the predetermined value, is greater than a force applied to the rotating assembly by the attractive magnetic interaction;
wherein:
the first magnet has a first pole;
the second magnet has a second pole magnetically attracted to the first pole and facing the first pole along the alignment direction in the stowed configuration, and
the alignment direction is perpendicular to the rotational axis.

2. The propeller assembly of claim 1, wherein:
the one or more pairs of magnets comprise a first pair and a second pair,
the first magnet in the first pair is mounted at a first position on the rotating assembly,
the second magnet in the first pair is mounted at a second position on the non-rotating member, and
the second magnet in the second pair is mounted at a third position on the non-rotating member, the third position and the second position on diametrically opposite sides of the rotational axis, and
the first magnet in the second pair is mounted at a fourth position on the rotating assembly, the fourth position and the first position on diametrically opposite sides of the rotational axis.

3. The propeller assembly of claim 1, wherein the first magnet and the second magnet are each sized to fit in an area having a width smaller than a largest width of the propeller.

4. The propeller assembly of claim 1, wherein:
the motor comprises an out-runner motor comprising a stator and a rotor and the rotating assembly comprises the rotor coupled to the propeller, the rotating assembly comprises an outer case, the non-rotating member is mounted on an inside of the outer case, and the first magnet is mounted on the outer case, or
the motor comprises an in-runner motor, the rotating assembly comprises a shaft coupled to the propeller, the motor drives the propeller via the shaft, the non-rotating member comprises an outer case, the shaft passes through the outer case, and the second magnet is mounted on the outer case.

5. The propeller assembly of claim 1, further comprising a mechanism connected to the rotating assembly and comprising the first magnet, the mechanism configured to move the first magnet away from the second magnet in response to a centrifugal force acting on the mechanism, the centrifugal force generated by the rotating assembly rotating about the rotational axis so that the propeller has the angular velocity greater than the predetermined value.

6. The propeller assembly of claim 5, wherein:
the motor comprises an in-runner motor,
the rotating assembly comprises a shaft connected to the propeller,
the motor drives the propeller via the shaft, and
the mechanism is mounted to the shaft.

7. The propeller assembly of claim 1, further comprising a hinge coupling the first magnet to the rotating assembly, the hinge:
pivoting the first magnet away from the second magnet in response to a centrifugal force generated by the rotating assembly rotating about the rotational axis so that the propeller has the angular velocity greater than the predetermined value, to a position wherein the first pole faces along a direction parallel to the rotational axis; and
holding the first magnet at a position wherein the first pole faces the second pole along the alignment direction so that the attractive magnetic interaction holds the propeller in the stowed configuration when the angular velocity is reduced below the predetermined value.

8. The propeller assembly of claim 1, further comprising a lever coupling the first magnet to the rotating assembly, the lever having a lever arm:
moving the first magnet away from the second magnet in response to a centrifugal force generated by the rotating assembly rotating about the rotational axis so that the propeller has the angular velocity greater than the predetermined value; and
holding the first magnet at a position wherein the attractive magnetic interaction is configured to hold the propeller in the stowed configuration when the angular velocity is reduced below the predetermined value.

9. An aircraft comprising the propeller assembly of claim 1, further comprising:
a fuselage;
the propeller assembly operatively connected to the fuselage;
the motor connected to the rotating assembly to rotate the propeller; and
a computer coupled to the motor, wherein the computer is configurable to command the motor to:
output the propeller torque, so that the propeller assembly generates a lift during a vertical flight of the aircraft, and decrease the angular velocity below the predetermined value so that the attractive magnetic interaction holds the propeller in the stowed configuration when the aircraft is cruising or moving in a horizontal flight.

10. The aircraft of claim 9, wherein:
the one or more propeller blades each comprise a longitudinal axis, and
the longitudinal axis in the stowed configuration is substantially aligned along a horizontal direction of the horizontal flight so as to reduce a drag of the propeller when the aircraft is moving in the horizontal flight.

11. The aircraft of claim 10, wherein the one or more distances are adjusted to account for an airflow impinging on the propeller blades moving the longitudinal axis into the alignment with the alignment direction.

12. A method of controlling a propeller assembly, comprising:
controlling the propeller assembly wherein the propeller assembly includes:
a rotating assembly comprising a propeller, the rotating assembly rotatably connected to a non-rotating member so as to rotate about a rotational axis relative to the non-rotating member;
one or more pairs of magnets comprising a first magnet mounted to the rotating assembly and a second magnet mounted to the non-rotating member, the second magnet forming an attractive magnetic interaction with the first magnet along an alignment direction; and wherein:
the propeller comprises one or more propeller blades;
in one of the pairs, the first magnet and the second magnet are positioned directly underneath one of the propeller blades in a stowed configuration;
one or more distances between the first magnet and the second magnet along the alignment direction are adjusted so that the attractive magnetic interaction induces an alignment of the propeller in the stowed configuration when an angular velocity is reduced below a predetermined value; and
deploying the propeller away from the stowed configuration, comprising outputting a propeller torque from a motor and driving the propeller at the angular velocity greater than the predetermined value so that the propeller torque is greater than a force applied to the rotating assembly by the attractive magnetic interaction;
wherein:
the first magnet has a first pole;
the second magnet has a second pole magnetically attracted to the first pole and facing the first pole along the alignment direction in the stowed configuration, and
the alignment direction is perpendicular to the rotational axis.

13. The method of claim 12, wherein the propeller torque is used to generate lift during at least one of a take-off, a first transition from the take-off to a horizontal flight, and a second transition between the horizontal flight and landing of an aircraft operably connected to the propeller assembly.

14. A propeller assembly, comprising:
a rotating assembly comprising a propeller, the rotating assembly rotatably connected to a non-rotating member so as to rotate about a rotational axis relative to the non-rotating member;
a first magnet attached to the rotating assembly;
a second magnet mounted or connected to the non-rotating member; and
a mechanism connected to the rotating assembly and comprising the first magnet, the mechanism configured to:
move the first magnet away from the second magnet into a first configuration in response to a centrifugal force acting on the mechanism, the centrifugal force generated by the rotating assembly rotating about the rotational axis so that the propeller has an angular velocity greater than a predetermined value,
position the first magnet closer to the second magnet in a second configuration when the angular velocity is smaller than the predetermined value, wherein:
an attractive magnetic interaction between the first magnet and the second magnet in the second configuration induces an alignment of the propeller in a stowed configuration when the angular velocity is reduced below the predetermined value,
the attractive magnetic interaction between the first magnet and the second magnet in the first configuration is less than a propeller torque outputted from a motor driving the propeller at the angular velocity greater than the predetermined value, and
the mechanism moves the first magnet through an angle of 90 degrees from the second configuration into the first configuration.

15. The propeller assembly of claim 14, wherein the mechanism comprises a hinge coupling the first magnet to the rotating assembly, the hinge:
pivoting the first magnet away from the second magnet in response to the centrifugal force generated by the rotating assembly rotating about the rotational axis so that the propeller has the angular velocity greater than the predetermined value; and
pivoting the first magnet towards the second magnet into the second configuration wherein the attractive magnetic interaction holds the propeller in the stowed configuration, when the angular velocity is reduced below the predetermined value.

16. The propeller assembly of claim 1, wherein:
the propeller assembly further comprises a mechanism that moves the first magnet through an angle of 90 degrees from a first configuration in response to a centrifugal force acting on the mechanism, the centrifugal force generated by the rotating assembly rotating about the rotational axis so that the propeller has the angular velocity greater than the predetermined value, to a second configuration that positions the first magnet closer to the second magnet when the angular velocity is smaller than the predetermined value.

* * * * *